US011636514B2

(12) United States Patent
Mori

(10) Patent No.: US 11,636,514 B2
(45) Date of Patent: Apr. 25, 2023

(54) INFORMATION PROCESSING APPARATUS AND INFORMATION PROCESSING METHOD

(71) Applicant: CANON KABUSHIKI KAISHA, Tokyo (JP)

(72) Inventor: Taisei Mori, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/231,730

(22) Filed: Apr. 15, 2021

(65) Prior Publication Data

US 2021/0326924 A1 Oct. 21, 2021

(30) Foreign Application Priority Data

Apr. 21, 2020 (JP) .............................. JP2020-075606

(51) Int. Cl.
*G06Q 30/02* (2012.01)
*G06Q 30/0251* (2023.01)
*G06F 16/903* (2019.01)
*G06Q 30/0601* (2023.01)
*G06V 20/40* (2022.01)

(52) U.S. Cl.
CPC ... *G06Q 30/0251* (2013.01); *G06F 16/90335* (2019.01); *G06Q 30/0625* (2013.01); *G06V 20/46* (2022.01); *G06V 2201/08* (2022.01)

(58) Field of Classification Search
CPC ....... G06Q 30/0207–30/0277; G06Q 30/0251; G06Q 30/0625; G06F 16/90335; G06V 20/46; G06V 2201/08; G06V 20/00
See application file for complete search history.

(56) References Cited

U.S. PATENT DOCUMENTS

| 6,931,254 B1* | 8/2005 | Egner .................. H04W 4/029 |
| | | 705/14.66 |
| 9,179,258 B1* | 11/2015 | Siegel ..................... G06Q 50/01 |
| 9,805,386 B2* | 10/2017 | Davis ................ G06Q 30/0226 |
| 10,699,537 B1* | 6/2020 | Schoner .............. G07G 1/0045 |
| 10,866,989 B1* | 12/2020 | Chandler ............. G06K 9/6282 |
| 2008/0249865 A1* | 10/2008 | Angell ............... G06Q 30/0277 |
| | | 705/14.51 |
| 2009/0006937 A1* | 1/2009 | Knapp ............... G06Q 30/0204 |
| | | 705/7.33 |

(Continued)

FOREIGN PATENT DOCUMENTS

| DE | 112019006422 T5 * | 12/2019 |
| JP | 2010-009566 A | 1/2010 |
| JP | 2011-253344 A * | 6/2010 |

*Primary Examiner* — Thuy N Nguyen
(74) *Attorney, Agent, or Firm* — Canon U.S.A., Inc. IP Division

(57) ABSTRACT

An information processing apparatus that analyzes video data obtained from an image capture apparatus to detect an article that has been pre-registered is disclosed. The apparatus, in a case where an article that is determined to be a property of an article holder that has been pre-registered is detected, searches for an advertisement viewer located within a range of a predetermined distance from the article holder from among advertisement viewers that have registered the article as an article they are interested in. The apparatus then informs an advertisement viewer found by the search of location information of the article.

10 Claims, 23 Drawing Sheets

(56) References Cited

U.S. PATENT DOCUMENTS

| | | | | |
|---|---|---|---|---|
| 2010/0262449 | A1* | 10/2010 | Monteforte | H04W 4/029 |
| | | | | 705/14.66 |
| 2012/0150598 | A1* | 6/2012 | Griggs | G06Q 20/384 |
| | | | | 705/14.16 |
| 2012/0173411 | A1* | 7/2012 | Ko | G06Q 10/10 |
| | | | | 726/26 |
| 2013/0262873 | A1* | 10/2013 | Read | H04L 63/0861 |
| | | | | 713/186 |
| 2014/0379617 | A1* | 12/2014 | Yang | G06Q 30/0631 |
| | | | | 706/46 |
| 2015/0066648 | A1* | 3/2015 | Kane, Jr. | G06F 16/29 |
| | | | | 705/14.58 |
| 2015/0269642 | A1* | 9/2015 | Cai | G06Q 30/0613 |
| | | | | 705/14.49 |
| 2015/0278917 | A1* | 10/2015 | Stoll | G06Q 30/0635 |
| | | | | 705/26.7 |
| 2015/0348122 | A1* | 12/2015 | Cornell | G06Q 30/0261 |
| | | | | 705/14.58 |
| 2016/0110836 | A1* | 4/2016 | Garg | G06Q 50/30 |
| | | | | 705/13 |
| 2016/0253710 | A1* | 9/2016 | Publicover | H04N 21/2187 |
| | | | | 705/14.66 |
| 2017/0293950 | A1* | 10/2017 | Rathod | G06Q 30/0283 |
| 2018/0249293 | A1* | 8/2018 | Doherty | H04W 4/08 |
| 2018/0278994 | A1* | 9/2018 | Holden | H04N 21/44218 |
| 2019/0236873 | A1* | 8/2019 | Estill | E05G 7/001 |
| 2020/0143172 | A1* | 5/2020 | Zucker | G06K 7/10366 |
| 2020/0242706 | A1* | 7/2020 | Cui | G06Q 20/12 |

* cited by examiner

FIG. 2
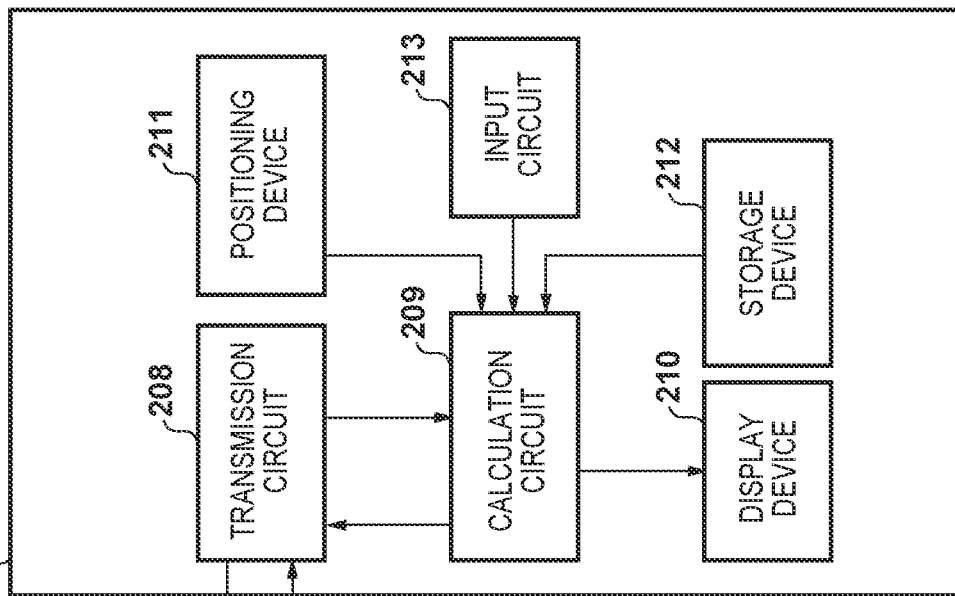
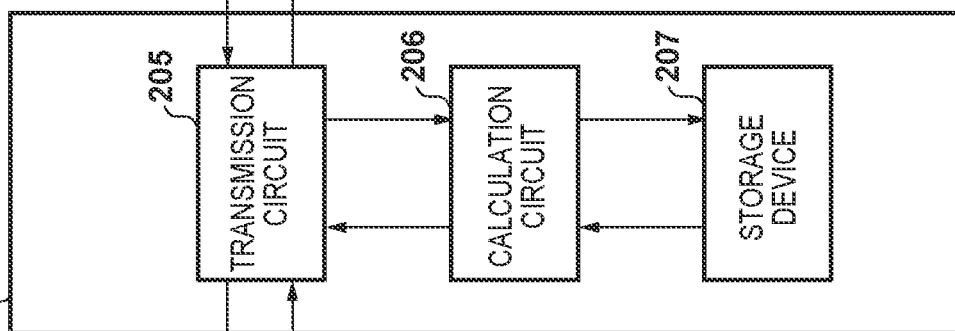
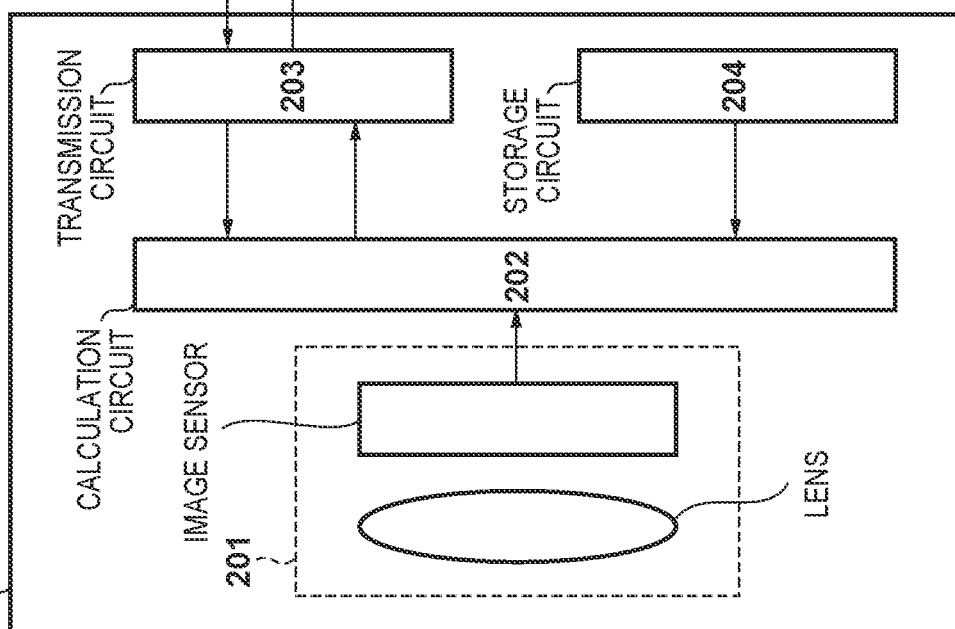

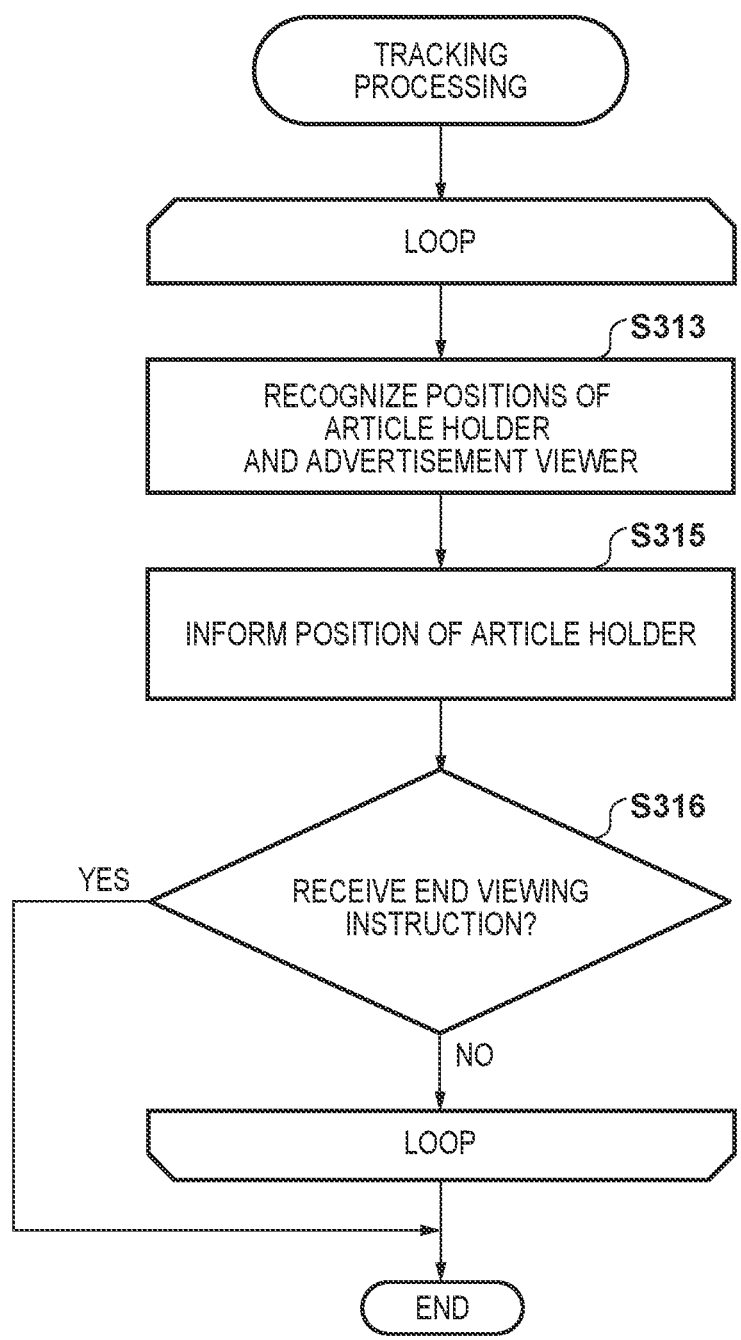

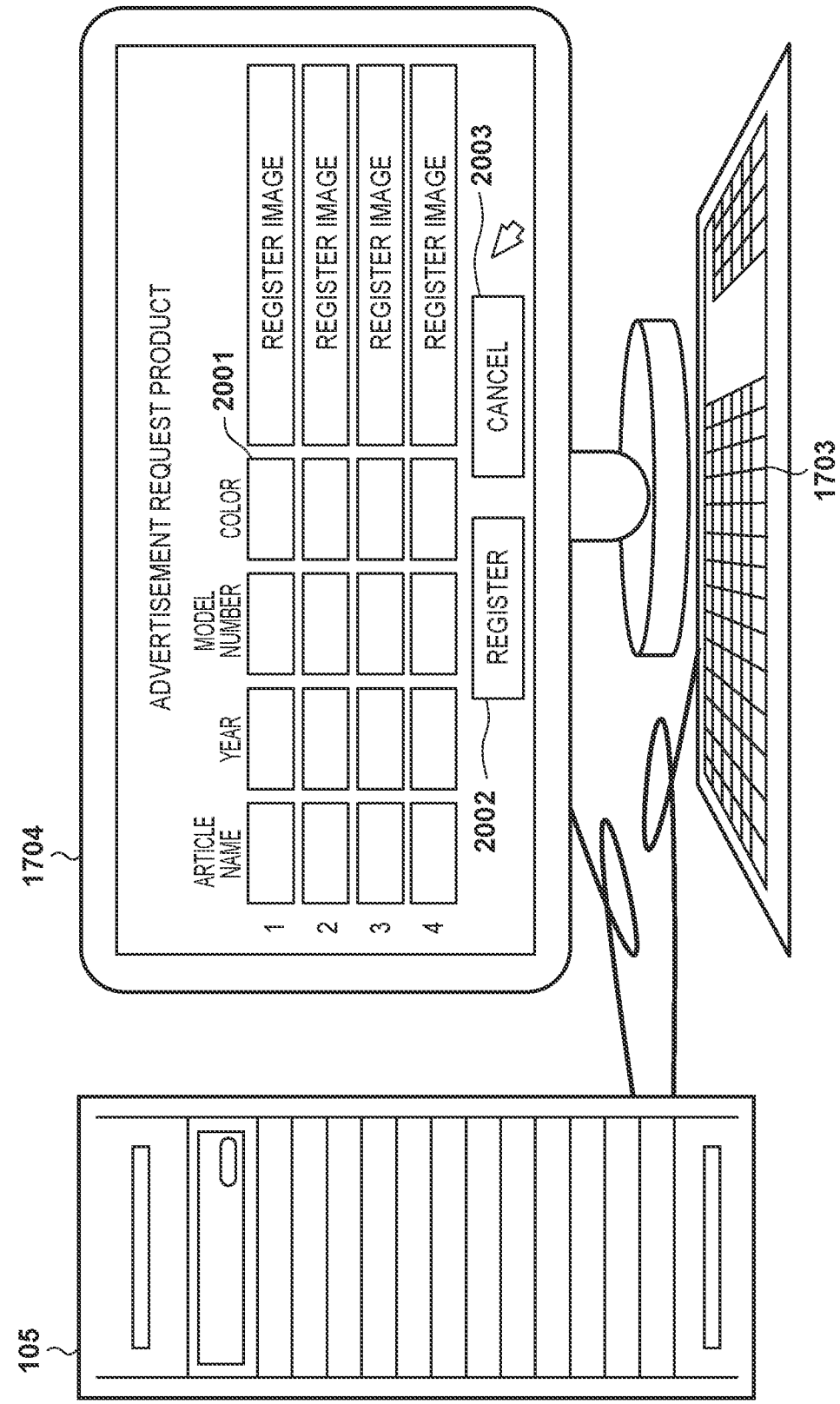

INFORMATION PROCESSING APPARATUS AND INFORMATION PROCESSING METHOD

BACKGROUND

Field of the Disclosure

The present disclosure relates to an information processing apparatus and an information processing method and particularly relates to technology for providing information about an article.

Description of the Related Art

Typically, when collecting information about a product you are interested in, you look at advertisement images and videos provided by companies on television, magazines, the Internet; go to a retail shop or a showroom and look and touch the actual product; and the like.

However, advertisement images and videos provided by companies are usually designed and made with the intent of drawing the attention of viewers. Thus, it is difficult to determine the size, color, quality, and the like of the actual product. Also, the desired product is not always at the retail shops and showrooms nearby. Furthermore, the product may be in the store, but where it is displayed may be hard to determine.

In Japanese Patent Laid-Open No. 2010-9566, a system is described which detects when a customer who is strolling through the store is near an article registered before coming to the store, controls a notification unit disposed on a display shelf, and informs the customer via audio, light, or the like.

With the system described in Japanese Patent Laid-Open No. 2010-9566, the time and effort of looking in the store for the desired product is reduced for the customer. However, the system is unable to provide information about products not registered beforehand and products not displayed in the store. Also, the system does not provide information to customers not in the store. Furthermore, regarding products such as durable goods, the system is unable to provide information about products actually used in terms of the change of color over time and the like.

SUMMARY

Embodiments of the present disclosure reduce one or more of the issues in the related art. Specifically, embodiments of the present disclosure provide an information processing apparatus and an information processing method that assists a user in collecting information relating to an article.

According to some embodiments of the present disclosure, there is provided an information processing apparatus comprising one or more processors that execute a program stored in a memory and function as: a detection unit configured to analyze video data obtained from an image capture apparatus to detect an article that has been pre-registered; a search unit configured to, in a case where an article that is determined to be a property of an article holder that has been pre-registered is detected, search for an advertisement viewer located within a range of a predetermined distance from the article holder from among advertisement viewers that have registered the article as an article they are interested in; and an informing unit configured to inform an advertisement viewer found by the search unit of location information of the article.

According to some embodiments of the present disclosure, there is provided an information processing method executed by an information processing apparatus, comprising: analyzing video data obtained from an image capture apparatus to detect an article that has been pre-registered; in a case where an article that is determined to be a property of an article holder that has been pre-registered is detected, searching for an advertisement viewer located within a range of a predetermined distance from the article holder from among advertisement viewers that have registered the article as an article they are interested in; and informing an advertisement viewer found in the searching of location information of the article.

According to some embodiments of the present disclosure, there is provided a non-transitory computer-readable medium storing a program for causing a computer to function as an information processing apparatus comprising: a detection unit configured to analyze video data obtained from an image capture apparatus to detect an article that has been pre-registered; a search unit configured to, in a case where an article that is determined to be a property of an article holder that has been pre-registered is detected, search for an advertisement viewer located within a range of a predetermined distance from the article holder from among advertisement viewers that have registered the article as an article they are interested in; and an informing unit configured to inform an advertisement viewer found by the search unit of location information of the article.

Further features of the present disclosure will become apparent from the following description of exemplary embodiments (with reference to the attached drawings).

BRIEF DESCRIPTION OF THE DRAWINGS

FIG. 2 is a block diagram illustrating an example of the functional configuration of apparatuses forming an advertisement system according to an embodiment.

FIGS. 3A to 3C are flowcharts relating to an advertisement method according to an embodiment.

FIGS. 18A to 18B are diagrams relating to registration processing for an advertisement requester according to an embodiment.

DESCRIPTION OF THE EMBODIMENTS

Figure 1:
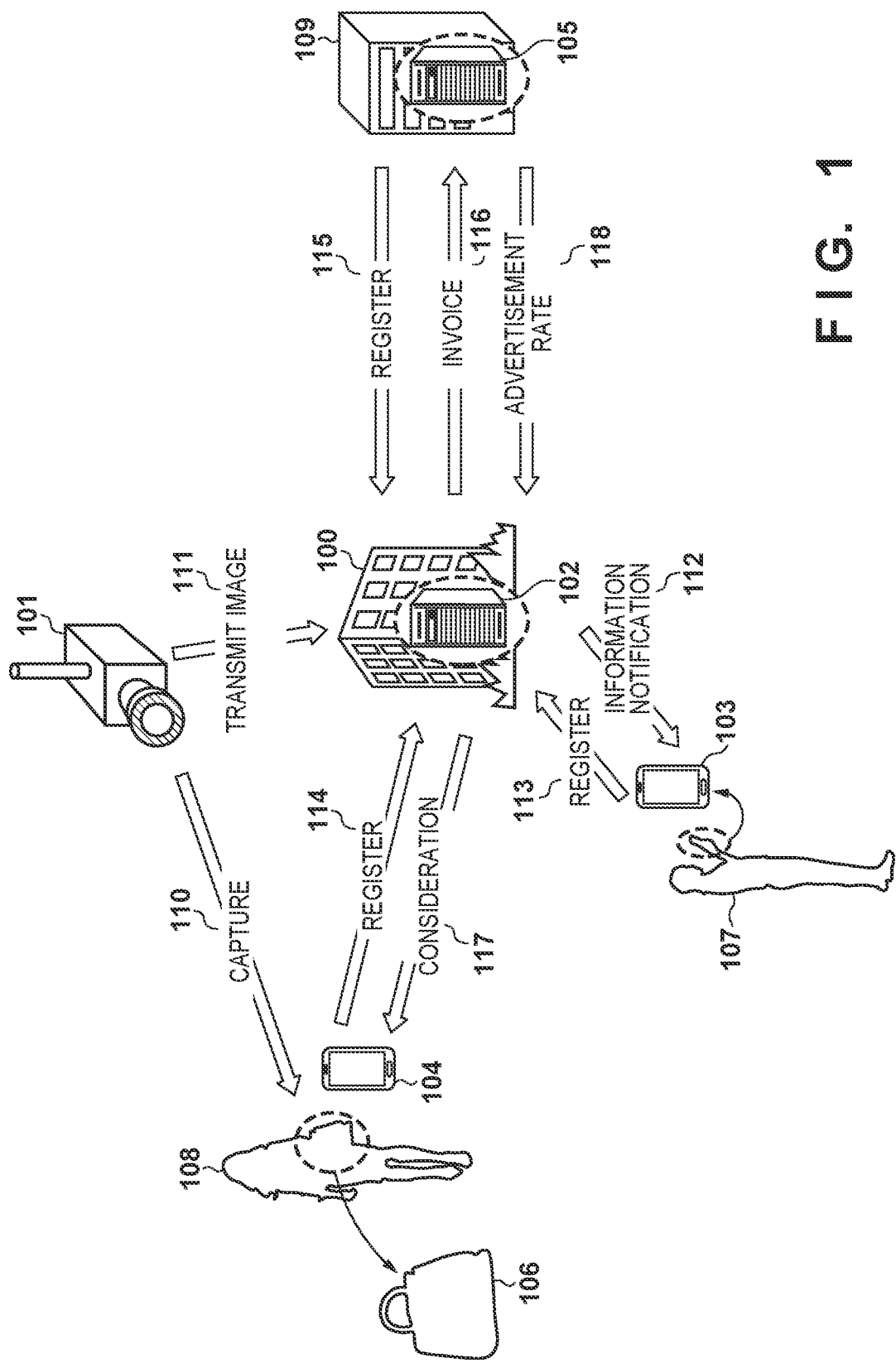
FIG. 1 is a schematic diagram illustrating an overview of an advertisement system according to an embodiment.

Hereinafter, embodiments will be described in detail with reference to the attached drawings. Note, the following embodiments are not intended to limit the scope of the disclosure. Multiple features are described in the embodiments, but limitation is not made in this disclosure that requires all such features, and multiple such features may be combined as appropriate. Furthermore, in the attached drawings, the same reference numerals are given to the same or similar configurations, and redundant description thereof is omitted.

First Embodiment

FIG. 1 is a schematic diagram illustrating an overview of an advertisement system according to an embodiment of the present disclosure. An advertisement company 100 is a company or public office that is the operator of the advertisement system. An article holder 108 is an owner of an advertised target article 106 and may be an individual or group. An advertisement viewer 107 is an advertisement target and is a normal user (consumer). An advertisement requester 109 is an individual or a group that advertises the target article 106 to the advertisement viewer 107 using the advertisement system and is typically the maker or retail shop of the target article 106.

Overview of Advertisement System

The article holder 108, via a registration procedure 114 for the advertisement company 100, grants permission to the advertisement company 100 to provide their location information to the advertisement viewer 107 and/or grants permission for an image of their face to be used in subject recognition processing. The article holder 108 receives a consideration 117 from the advertisement company 100 for granting permission to provide the location information. Note that the article holder 108 may additionally or instead of a consideration for granting permission receive the consideration 117 for actually providing the location information.

The advertisement viewer 107 who wishes to use the advertised service (view the advertisement) provided by the advertisement company 100 enters into an agreement to view the advertisement with the advertisement company 100 via a registration procedure 113. The advertisement viewer 107, via the registration procedure 113, can register the type of articles, specific product names, and the like of articles they are interested in or are thinking of buying. Also, the advertisement viewer 107 may grant permission to the advertisement company 100 to the user search history information of the search service they used on their computer or portable terminal.

Note that in a case where the viewer-targeted advertisement service provided by the advertisement company 100 is a paid service, an agreement may be included in the agreement between the advertisement viewer 107 and the advertisement company 100 in the registration procedure 113 relating to payment of a consideration such as a service fee.

The advertisement requester 109 who wishes to use the advertised service (provide the advertisement) provided by the advertisement company 100 enters into an agreement to provide the advertisement with the advertisement company 100 via a registration procedure 115. The advertisement requester 109, via the registration procedure 115, registers the article for advertisement and enters into an agreement relating to payment of the advertisement rate. When the article is registered, a photo of the article and other information that facilitates the recognition of the article from a captured image can be registered. Note that the advertisement rate may be calculated on the basis of the number of times the advertisement is run or may be a fixed amount.

To use in the advertisement, the advertisement company 100 obtains a video taken in real time by an image capture apparatus 101 with a known placement position, such as a video camera placed inside a facility or outside. The image capture apparatus 101 may be managed by the advertisement company 100 or may be managed by another party. In a case of the latter, an agreement relating to provision of the video may be concluded between the party managing the image capture apparatus 101 and the advertisement company 100, for example.

Next, a method of providing an advertisement to the advertisement viewer 107 using an advertisement system will be described. In an information processing apparatus 102 (for the sake of convenience, this is listed as a single component, but in reality, multiple information processing apparatuses are used) managed by the advertisement company 100 is provided with a video signal from the image capture apparatus 101 in real time. Also the location information of the advertisement viewer 107 and the article holder 108 are provided by a mobile phone company at predetermined time intervals, for example.

The information processing apparatus 102 analyzes the video provided from the image capture apparatus 101 and detects the target article 106 registered by the advertisement requester 109. Also, the information processing apparatus 102 determines whether the article holder 108 is shown in the video on the basis of the relationship between the location information of the image capture apparatus 101 and the location information of the article holder 108, the detection result of a face region of the article holder 108, and the like. Note that in addition to the location information of the image capture apparatus 101, information relating to the image capture direction and angle of view may be used in this determination.

The information processing apparatus 102 identifies the article holder 108 holding the target article 106 according to a predetermined determination condition. Note that the information processing apparatus 102 transmit an SMS or the like including a description of the target article 106 to the information terminal 104 or the like of the article holder 108 considered to be holding the target article 106, and the article holder 108 may confirm that they are actually holding the target article 106. Note that in FIG. 1, the article holder 108 is illustrated moving while carrying the target article 106. However, the article holder 108 may not be carrying the target article 106. However, in a case where the location information of the article holder 108 is informed as location information of the target article 106, it is presumed that the target article 106 and the article holder 108 are not far apart in terms of distance.

Also, the information processing apparatus 102 determines whether or not the advertisement viewer 107 that has registered the target article 106 held by the identified article holder 108 as an article they are interested in is located close to the article holder 108. For example, the information processing apparatus 102 is capable of determining the two as being located close to one another in a case where the distance calculated from the location information of the article holder 108 and the advertisement viewer 107 is equal to or less than a threshold.

In a case where the information processing apparatus 102 determines that the advertisement viewer 107 that has registered the article held by the article holder 108 as an article they are interested in is located close to the article holder 108, the information processing apparatus 102 informs the advertisement viewer 107 of the location of the article holder 108 (the target article 106). For example, the information processing apparatus 102 is capable of informing of the location of the target article 106 by transmitting a message to an information terminal 103 of the advertisement viewer 107, for example.

FIG. 2 is a block diagram illustrating an example of the functional configuration of the image capture apparatus 101, the information processing apparatus 102, and the information terminal 103 owned by the advertisement viewer 107.

The image capture apparatus 101 is a fixed point camera, for example, and includes an image capture circuit 201, a calculation circuit 202, a transmission circuit 203, and a storage device 204. The image capture circuit 201 includes a lens and an image sensor. The lens forms an optical image of a subject on an imaging surface of the image sensor. The lens angle of view and the image capture direction may be fixed or changeable. The image sensor is a CMOS image sensor, for example, and is provided with a plurality of pixels that include a photoelectric converter circuit. The image sensor converts the subject optical image via the pixels into an electrical signal group (analog image signal). Herein, the image sensor includes an A/D converter and outputs image data which is the A/D converted analog image signal.

The calculation circuit 202 is a CPU, for example, that loads a program stored on a ROM of the storage device 204 on a RAM of the storage device 204 and executes the program. By the program being executed, the calculation circuit 202 implements various operations of the image capture apparatus 101, such as controlling the circuits inside the image capture apparatus 101, communicating with an external device, and the like. Note that the calculation circuit 202 may include dedicated hardware for processing the image data for use in image processing. The calculation circuit 202 reads out image data from the image capture apparatus at a predetermined frame rate and generates moving image data (video data) using known image processing (for example, development processing, encoding processing, and the like). Also, the calculation circuit 202 may continuously execute automatic focus adjustment (AF) and automatic exposure control (AE) of the lens on the basis of the video data. Furthermore, the calculation circuit 202 is capable of executing analysis processing as a part of the image processing. The calculation circuit 202 is capable of changing the setting value of the image capture apparatus 101, the lens angle of view, the focusing distance, and the image capture direction according to a command received from an external device.

The transmission circuit 203 is a communication interface between an external device and the image capture apparatus 101 and is compliant with at least one wired and/or wireless communication protocol. Note that in FIGS. 1 and 2, the image capture apparatus 101 and the information processing apparatus 102 are illustrated as communicating directly. However, they may communicate via a network. The calculation circuit 202 streams the video data to the information processing apparatus 102 via the transmission circuit 203. Note that video data of the image capture apparatus 101 managed by a party other than the advertisement company 100 may be provided to the information processing apparatus 102 via the administrator.

The storage device 204 includes the ROM, the RAM, a hard disk drive, and the like. The ROM stores programs executed by the calculation circuit 202, various setting values of the image capture apparatus 101, and the like. The RAM is used when the calculation circuit 202 executes programs, as buffer memory for the video data, and the like. The hard disk drive (or another large capacity storage device) stores the most recent predetermined amount of time of video data, for example.

The information processing apparatus 102 is a computer device and includes a transmission circuit 205, a calculation circuit 206, and a storage device 207. In FIG. 2, one apparatus is illustrated. However, in reality, the information processing apparatus 102 may be an assembly of a plurality of computer devices. The transmission circuit 205 is a communication interface between an external device and the information processing apparatus 102 and is compliant with at least one wired and/or wireless communication protocol. In FIG. 2, the single transmission circuit 205 is illustrated as communicating to the image capture apparatus 101 and the information terminal 103. However, the transmission circuit 205 may differ depending on the communication method. Also, the communication between the image capture apparatus 101 and the information terminal 103 may be executed via a network.

The calculation circuit 206 is a CPU, for example, that loads a program stored on a ROM of the storage device 207 on a RAM of the storage device 207 and executes the program. By the program being executed, the calculation circuit 206 causes the information processing apparatus 102 to function as an advertisement providing apparatus, by controlling the circuits inside the information processing apparatus 102, communicating with an external device, and the like.

The calculation circuit 206 executes registration processing for users of the advertisement providing system including the article holder 108, the advertisement viewer 107, and the advertisement requester 109 and protects and manages information relating to the users and articles obtained in the registration processing and user location information. Also, the calculation circuit 206 analyzes the video data obtained from the image capture apparatus 101 and determines whether or not the identified advertisement viewer 107 is located near the article holder 108. Furthermore, in a case where it is determined that the advertisement viewer 107 is located near the article holder 108 corresponding to a condition, the calculation circuit 206 transmits information of the article holder 108 to the advertisement viewer 107.

The storage device 207 includes the ROM, the RAM, a hard disk drive, and the like. The ROM stores programs executed by the calculation circuit 206, various setting values of the information processing apparatus 102, and the like. The RAM is used when the calculation circuit 206 executes programs, as buffer memory for various data, and the like. The hard disk drive (or a large capacity storage device) stores registration information of the users (the advertisement viewer 107, the article holder 108, and the advertisement requester 109). Also, information relating to the target article 106 advertisement, the current location information of the advertisement viewer 107 and the article holder 108, and information of the image capture apparatus 101 are also stored in the hard disk drive, and the calculation circuit 206 updates these as necessary.

The information terminal 103 is a small computer device, such as a smart phone, a tablet computer, a laptop computer, or the like. The information terminal 103 includes a transmission circuit 208, a calculation circuit 209, a display device 210, a positioning device 211, a storage device 212, and an input circuit 213.

The calculation circuit 209 is a CPU, for example, that loads a program stored on a ROM of the storage device 212 on a RAM of the storage device 212 and executes the program. By the program being executed, the calculation circuit 209 implements various operations of the information terminal 103, such as controlling the circuits inside the information terminal 103, communicating with an external device, and the like.

The transmission circuit 208 is a communication interface between an external device and the information terminal 103 and is compliant with at least one wired and/or wireless communication protocol. Typically, the transmission circuit 208 includes a communication interface compliant with a mobile communications protocol, such as 3G or LTE, and a communication interface compliant with a general-purpose wireless communication protocol, such as wireless LAN or Bluetooth (registered trademark). Note that in FIGS. 1 and 2, the information terminal 103 and the information processing apparatus 102 are illustrated as communicating directly. However, they may communicate via a network. The calculation circuit 209 receives a notification relating to the advertisement from the information processing apparatus 102 via the transmission circuit 208.

The storage device 212 includes the ROM, the RAM, an SSD, and the like. The ROM stores programs executed by the calculation circuit 209, various setting values of the information terminal 103, and the like. The RAM is used when the calculation circuit 209 executes programs, as buffer memory for various data, and the like. The SSD (or a large capacity storage device) stores information of the advertisement viewer 107, user data, applications, and the like.

The display device 210 is a liquid crystal display, for example, and displays various displays according to a program executed by the calculation circuit 209. The display device 210 may be a touch display.

The positioning device 211 includes a Global Positioning System (GPS) receiver, for example, and calculates the location information indicating the geographic location of the information terminal 103 on the basis of the reception signal. Note that because the information terminal 103 is carried by the advertisement viewer 107, the information processing apparatus 102 treats the location information of the information terminal 103 as the location information of the advertisement viewer 107. Note that the positioning device 211 may use location information of an access point of a wireless LAN, a GPS signal received by a base station, or the like as auxiliary information to measure the location of the information terminal 103.

The input circuit 213 is an input device, such as a touch panel or a keyboard, operated by the advertisement viewer 107.

Overview of Advertisement Providing Operation

Figure 3A:
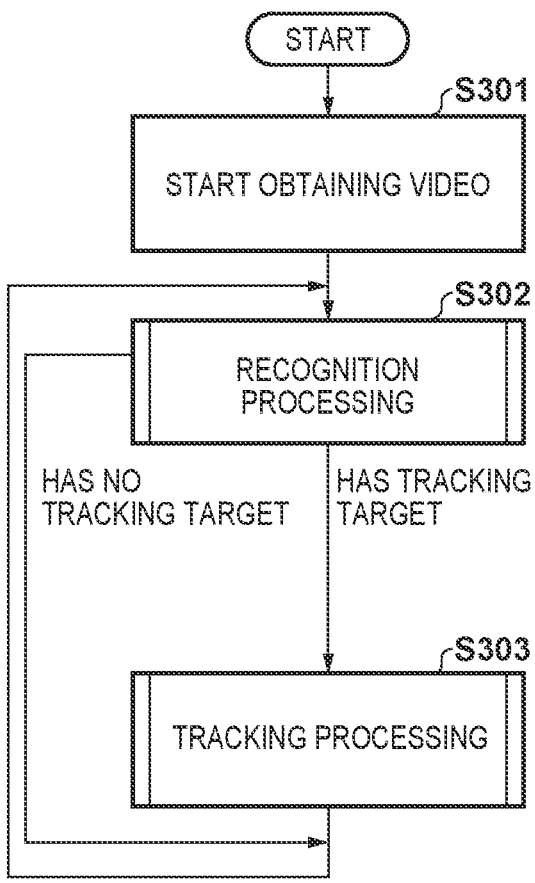
Figure 3B:
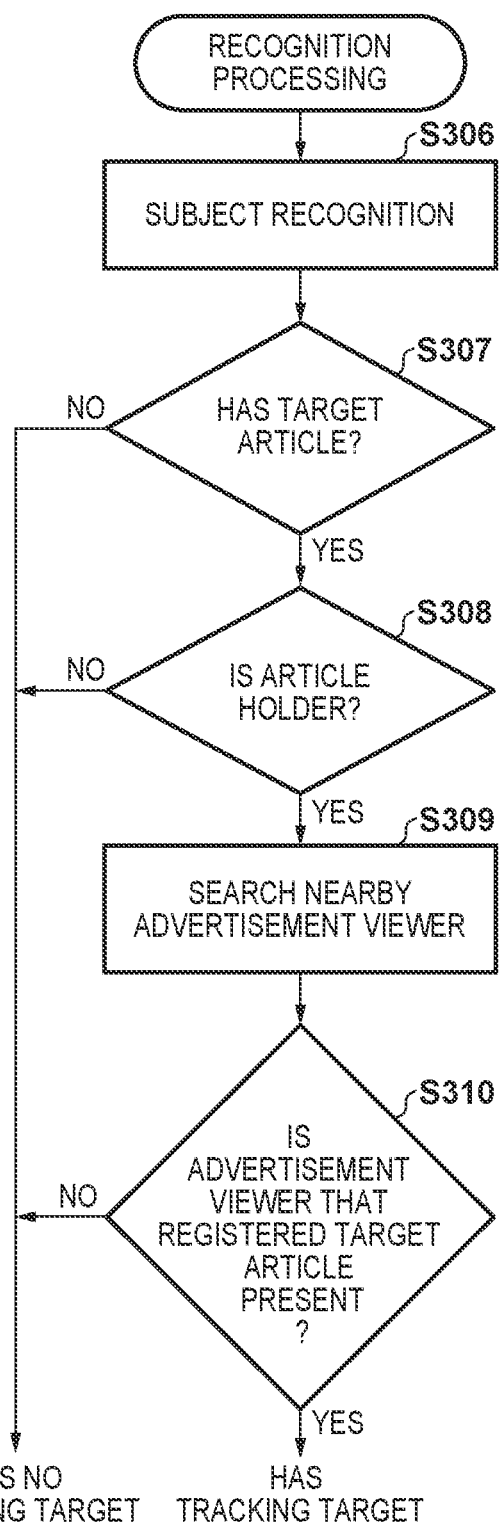

FIGS. 3A to 3C are flowcharts relating to the operations of the information processing apparatus 102. As illustrated in FIG. 3A, the information processing apparatus 102 starts obtaining video in step S301 and continuously executes recognition processing in step S302 and tracking processing in step S303. In step S301, the calculation circuit 206 starts obtaining video data from the image capture apparatus 101 via the transmission circuit 205. The calculation circuit 206 temporarily stores the obtained video data in the storage device 207. Note that unique information of the image capture apparatus 101 is included in the video data output by the image capture apparatus 101, and the information processing apparatus 102 is capable of identifying the image capture apparatus 101 that captured the video data and the location thereof on the basis of the unique information.

In step S302, the calculation circuit 206 (a detection unit) applies recognition processing of the target article 106 to the obtained video data. From the result of the recognition processing and the location information and registration information of the article holder 108 and the advertisement viewer 107, the calculation circuit 206 identifies the video data for tracking processing of the article holder 108 and the advertisement viewer 107 satisfying a specific condition.

In step S303, the calculation circuit 206 executes the tracking processing of the article holder 108 and the advertisement viewer 107 on the video data determined as the target for tracking processing in step S302. Note that the calculation circuit 206 tracks changes in the detection state of the target article 106 by continuously executing the processing of step S302 and step S303 on all of the video data.

The recognition processing of step S302 will now be described in detail using the flowchart of FIG. 3B. In step S306, the calculation circuit 206 applies recognition processing on each piece of video data (video stream) obtained in step S301 and determines whether or not the registered target article 106 is shown. The calculation circuit 206 is capable of using the information (for example, an image of the target article 106) of the target article 106 that the advertisement requester 109 provided when registering the target article 106, for example, and applying a known recognition method to the video data. Examples of such methods include template matching using the image of the target article 106 as a template, a method using a neural network trained using the image of the target article 106, and the like.

In step S307, as the recognition processing result, the calculation circuit 206 determines for each piece of video data whether or not one or more types of the target article 106 are shown. For video data for which it is determined that the target article 106 is not shown, the calculation circuit 206 determines that the article holder 108 and the advertisement viewer 107 targeted for tracking processing are not present, and the following processing is skipped. For video data for which it is determined that the target article 106 is shown, the calculation circuit 206 executes the processing of step S308.

In step S308, the calculation circuit 206 (determination unit) determines whether or not the detected target article is the property of the registered article holder 108. The calculation circuit 206 is capable of determining this on the basis of image recognition processing executed on the video data and location information. For example, the calculation circuit 206 uses face information provided at the time of registration by the article holder 108 that owns the detected target article 106 to execute image recognition processing. Also, in a case where the face region of the article holder 108 is detected within a distance less than a threshold from the target article 106 in the image, the calculation circuit 206 determines that the target article 106 is the property of the article holder 108. Alternatively, from the location information of the image capture apparatus 101 that captured the video data and the location information of the article holder 108 that owns the detected target article 106, the calculation circuit 206 determines whether or not the article holder 108 with the distance to the image capture apparatus 101 less than a threshold exists. In a case where the calculation circuit 206 determines that the article holder 108 that owns the detected target article 106 exists within a distance from the image capture apparatus 101 less than the threshold, the calculation circuit 206 determines that the target article 106 is the property of the article holder 108. Note that these two methods may be used in combination or another method may be used.

Also, note that in a case where the location information is used, in addition to the location information of the image capture apparatus 101, image capture direction information and lens focal length information may be used. In this case, instead of just the distance from the image capture apparatus 101, whether the article holder 108 is present in the image capture direction (or within the image capture range) is confirmed, thus increasing determination accuracy. Note that the calculation circuit 206 may confirm the personal identity by transmitting, to the portable terminal of the article holder 108 determined to own the detected target article 106, a message for confirming that the determination by the calculation circuit 206 is correct. Also, the detected target article 106 is treated as the property of the identified article holder 108 only when the personal identity is confirmed by the calculation circuit 206.

Furthermore, the confirmation message may be a query as to whether or not the article holder 108 will provide their location information. By answering the confirmation message with a no to providing location information, the article holder 108 can temporarily refuse to provide location information. The information processing apparatus 102 informs the advertisement viewer 107 of location information only when an answer of yes is received for providing location information. Accordingly, this can prevent the location information from being provided when the article holder 108 does not wish to provide the location information, and the privacy of the article holder 108 can be protected.

Note that the information of the target article 106 and the article holder 108 used in the image recognition processing in step S306 and step S308 may be obtained from an external device instead of or in addition to being obtained from the storage device 207 of the information processing apparatus 102.

For video data for which it is determined that the article holder 108 that owns the target article 106 is not present, the calculation circuit 206 determines that the target for tracking processing is not present, and the following processing is skipped. In a case where the calculation circuit 206 determines that the article holder 108 determined to own the target article 106 is present, the processing of step S309 is executed.

In step S309, the calculation circuit 206 (searching unit) determines whether or not any advertisement viewer 107 that registered the target article 106 is present within the range of a predetermined distance from the article holder 108 being determined to own the target article 106. In this determination, the calculation circuit 206 is capable of using the location information of the article holder 108 determined to own the target article 106 and the location information of every advertisement viewer 107 that registered the target article 106. Note that the calculation circuit 206 may determine that an advertisement viewer 107 shown in the same image as the target article 106 to be present with the predetermined distance from the article holder 108 determined to own the target article 106. The calculation circuit 206 is capable of determining whether or not an advertisement viewer 107 is shown by applying to the video data subject detection processing using the face information obtained when the advertisement viewer 107 registered.

Note that an advertisement viewer 107 that is merely viewing the target article 106 and has not registered the target article 106 may be treated in a similar manner as an advertisement viewer 107 that has registered the target article 106. From the relationship between the orientation of the face of an advertisement viewer 107 detected by the subject detection processing and the location of the target article 106, the calculation circuit 206 is capable of detecting the advertisement viewer 107 considered to be viewing the target article 106.

In step S310, the calculation circuit 206 determines that the target of tracking processing is not present in a case where any advertisement viewer 107 that registered the target article 106 is not present within the range of the predetermined distance from the article holder 108 determined to own the target article 106. On the other hand, the calculation circuit 206 sets the article holder 108 and the advertisement viewer 107 as targets for tracking processing in a case where an advertisement viewer 107 that registered the target article 106 is determined to be present within the predetermined distance from the article holder 108 determined to own the target article 106. Note that the tracking targets, the article holder 108 and the advertisement viewer 107, are not limited to having a one-to-one correlation and may have a one-to-many correlation or a many to one correlation.

Via the processing described above, the calculation circuit 206 determines whether or not there is a tracking target for each of the target articles 106 detected from the video data. The calculation circuit 206 stores the information identifying the tracking targets, the article holder 108 and the advertisement viewer 107, in the RAM of the storage device 207.

The tracking processing of step S303 will now be described in detail using the flowchart of FIG. 3C. The information processing apparatus 102 executes the tracking processing illustrated in FIG. 3C for each combination of the article holder 108 and the advertisement viewer 107 set as a target for tracking processing in the recognition processing of step S302.

In step S313, the calculation circuit 206 determines the location of the tracking targets, the article holder 108 and the advertisement viewer 107, on the basis of their location information. The location information of the advertisement viewer 107 may be the location information measured by the positioning device 211 obtained from the information terminal 103. Also, the location information of the article holder 108 may be the location information of the information terminal 104 of the article holder 108. A calculation circuit 206 is capable of obtaining the location information of the information terminal 104 directly from the information terminal 104 or via the mobile phone company.

Note that the location of the article holder 108 and the advertisement viewer 107 may be identified without using the location information measured by the information terminals 104 and 103. For example, the location of the article holder 108 may be identified from the location information of the image capture apparatus 101 capturing an image of the article holder 108, and the location of the advertisement viewer 107 may be identified from the location information of the image capture apparatus 101 capturing an image of the advertisement viewer 107. In this case, by using the information relating to image capture direction and angle of view, the accuracy of the location can be improved. Also, a case where a plurality of the image capture apparatus 101 capture the same article holder 108 (or advertisement viewer 107) at the same time allows the accuracy of the location to be improved. The location information obtained from the information terminals 103 and 104 or the mobile phone company and the location information of the image capture apparatus 101 may be used together or switched between. For example, the location information of the image capture apparatus 101 may be used in a case where the location information cannot be obtained from a portable terminal or the mobile phone company.

Note that in a case where the distance obtained from the location relationship between the article holder 108 and the advertisement viewer 107 is greater than the threshold consistently for a certain amount of time (for example, the threshold used in step S309), the calculation circuit 206 may remove the article holder 108 and the advertisement viewer 107 from being tracking targets. Note that at this point in time, the location information of the article holder 108 has already been provided to the advertisement viewer 107 and the information terminal 103. Accordingly, the calculation circuit 206 may confirm with the advertisement viewer 107 before ending provision of the location information of the article holder 108 whether it is ok to end provision. The calculation circuit 206, for example, transmits a confirmation message to the information terminal 103 of the advertisement viewer 107 and, in a case where permission is obtained, removes the article holder 108 and the advertisement viewer 107 from being tracking targets. This ends the provision of the location information of the article holder 108 to the advertisement viewer 107. On the other hand, in a case where the response to the confirmation message to an instruction to continue provision of the location information, the calculation circuit 206 continues to provide the location information for a certain amount of time until the distance between the advertisement viewer 107 and the article holder 108 exceeds the threshold.

In step S315, the calculation circuit 206 (informing unit) transmits the location information of the article holder 108 to the information terminal 103 of the advertisement viewer 107 via the transmission circuit 205. The calculation circuit 209 of the information terminal 103 informs the user (the advertisement viewer 107) that the location information will be received. When the user performs an instruction to display the location information, the calculation circuit 209 using a map application installed in the information terminal 103, for example, to display the location of the article holder 108 on the display device 210. Also, the calculation circuit 209 may use the navigation function of the map application to display the route from the advertisement viewer 107 to the article holder 108 and provide navigation thereto. Note that the calculation circuit 209 may display the location of the article holder 108 and information (for example, an image extracted from the video data, an image prepared in advance, an article name, and the like) about the target article 106 together. Also, the information terminal 103 may include a gyro sensor and the like, and the calculation circuit 209, in a case where the orientation of the terminal is able to be detected, may inform of what direction the article holder 108 is in instead of or in addition to displaying the location on the map.

In step S316, the calculation circuit 206 determines whether or not an end viewing instruction has been received from the information terminal 103 of the advertisement viewer 107 via the transmission circuit 205. In a case where an end viewing instruction has not been received, the calculation circuit 206 repeatedly executes the processing again from step S313. Also, in a case where an end viewing instruction has been received, the calculation circuit 206 removes the combination of the article holder 108 and the advertisement viewer 107 from being tracking targets.

As described above, the calculation circuit 206 continuously executes step S302 to detect new tracking targets while also continuously executing the tracking processing of step S303 on each tracking target.

Figure 4:
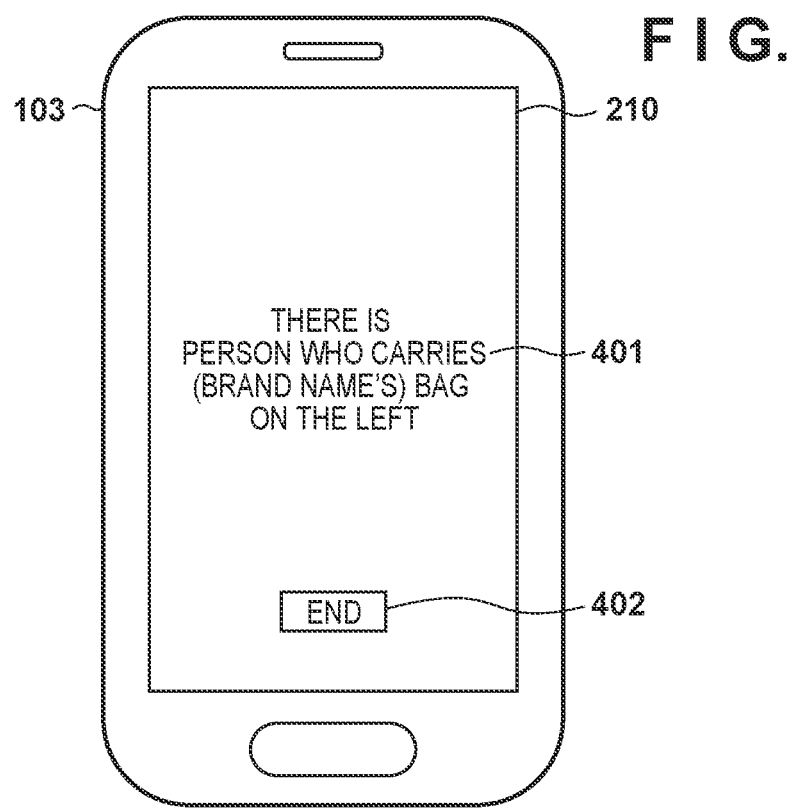
FIG. 4 is a diagram illustrating an example of a display on an information terminal according to an embodiment.

FIG. 4 is a diagram illustrating an example of a display on the information terminal 103 that has received the location information (an information notification 112 illustrated in FIG. 1) of the article holder 108 from the information processing apparatus 102 in step S315. In the example illustrated in FIG. 4, by displaying on the display device 210 a message 401 indicating the direction where the article holder 108 is, the advertisement viewer 107 is informed of the location of the article holder 108. Also, information about the target article 106 is included in the message 401. As described above, instead of only displaying the direction, the location of the article holder 108 on a map may be displayed, or the route from the advertisement viewer 107 to the article holder 108 may be displayed and navigation thereto may be provided.

Also, in the example illustrated in FIG. 4, the message 401 as well as an end button 402 is displayed. When the end button 402 is operated (touched), the calculation circuit 209 transmits an end viewing instruction to the information processing apparatus 102 and ends the display of the location information of the article holder 108.

Note that instead of or in addition to informing of the location information of the article holder 108 in step S315, a video of the article holder 108 may be provided to the information terminal 103 of the advertisement viewer 107. For example, in a case where the article holder 108 is in a crowded area, it may be difficult to identify the article holder 108. By providing a video of the article holder 108, the article holder 108 is made easier to find and information about the actual use state of the target article 106 can be obtained from the video without needing to be near the article holder 108.

According to the advertisement system of the present embodiment, by the advertisement viewer 107 registering an article they are interested in as the target article 106, the advertisement viewer 107 can be informed that the actual target article 106 is nearby. Accordingly, the actual target article 106 can be confirmed by taking advantage of the fact that the target article 106 is nearby. This allows for information that is unable to be obtained from the state of the article when on display in an advertisement or in the store to be easily obtained. Also, in a case where the article holder 108 is carrying or using the target article 106, trends relating to the age, gender, and the like of the users can be known, allowing for an informed choice to be made when purchasing the target article 106.

The advertisement system of the present embodiment has been described above in terms of the operations of the information processing apparatus 102 at the center of the system mainly from the perspective of providing information to the advertisement viewer 107. Other operations of the information processing apparatus 102 will be described below.

Figure 5:
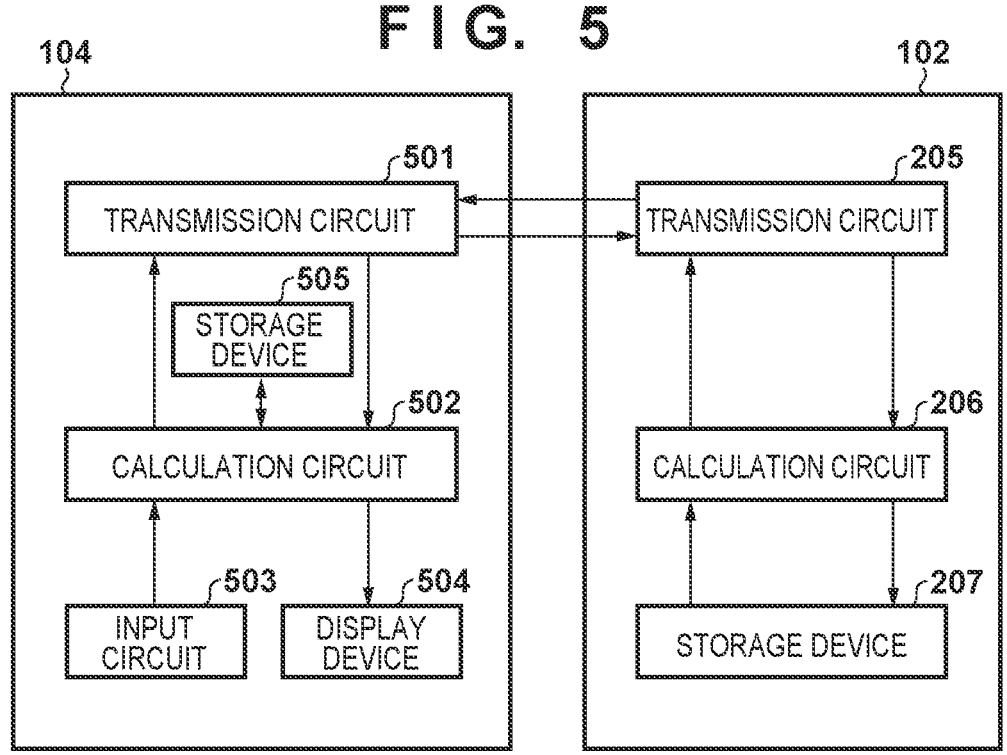
FIG. 5 is a block diagram illustrating an example of the functional configuration of an information terminal of an article holder and an information processing apparatus according to an embodiment.

Processing of Registration and Consideration Payment for Article Holder First, the operations of the information processing apparatus 102 relating the registration procedure 114 and the consideration 117 for the article holder 108 illustrated in FIG. 1 will be described. FIG. 5 is a block diagram illustrating the information terminal 104 of the article holder 108 and the information processing apparatus 102 and the functional configuration thereof relating to the registration procedure 114 and the consideration 117.

The information terminal 104 is a computer device owned by the article holder 108. In this example, the information terminal 104 is a portable computer device, such as a smart phone, a tablet terminal, or a notebook computer. However, the information terminal 104 may be a stationary computer device such as a desktop computer.

The information terminal 104 and the information processing apparatus 102 are capable of communicating in both directions via transmission circuits 501 and 205, respectively. Note that a network may exist between the information terminal 104 and the information processing apparatus 102. The transmission circuits 501 and 205 communicate according to a wired or wireless communication protocol both are compliant to. In a case where the information terminal 104 is a smart phone, for example, the information terminal 104 and the information processing apparatus 102 communicate in both directions via a mobile communication network or directly via a wireless LAN or Bluetooth (registered trademark).

A calculation circuit 502 is a CPU, for example, that loads a program stored on a ROM of a storage device 505 on a RAM of the storage device 505 and executes the program. By the program being executed, the calculation circuit 502 makes the information terminal 104 execute various operations, such as controlling the circuits inside the information terminal 104, communicating with an external device, and the like. Included in the program stored on the ROM of the storage device 505 may be various typical application programs installed on a computer device, such as a web browser, a camera application, and the like.

An input circuit 503 is an input device, such as a touch panel or a keyboard, operated by the article holder 108. A display device 504 may be a liquid crystal display or an organic EL display, for example, and may be a touch display.

The configuration of the information processing apparatus 102 is as described in reference to FIG. 2. The information of each article holder 108 is stored in a non-volatile storage device such as the ROM or SSD of the storage device 207. Included in the information of the article holder 108 may be, but is not limited to, information (personal information, article information, password, and the like) input at the time of registration, consideration information, and the like.

The calculation circuit 206 causes the information processing apparatus 102 to function as a web server by executing a program, for example, and provides information for displaying various input forms to the web browser that accesses the web server.

Figure 6:
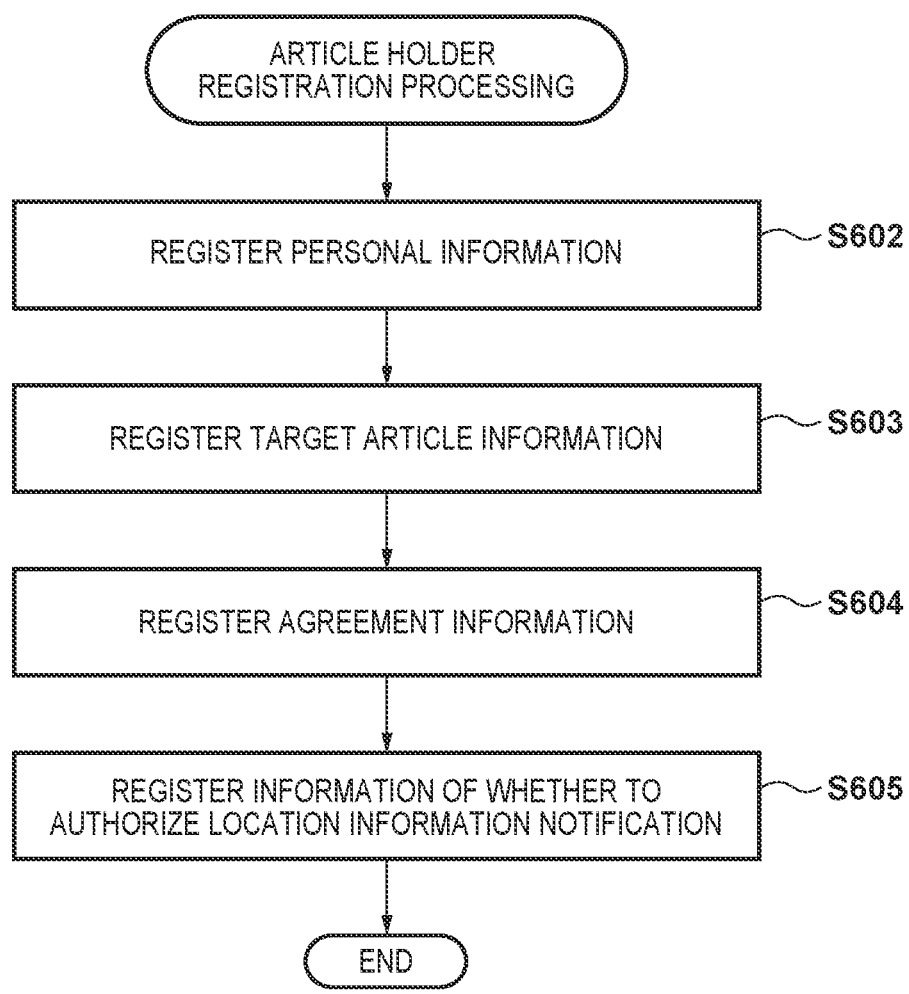
FIG. 6 is a flowchart relating to registration processing for an article holder according to an embodiment.

FIG. 6 is a flowchart relating to the operations of the information processing apparatus 102 relating to registration (the registration procedure 114 of FIG. 1) of the article holder 108.

In step S602, the calculation circuit 206 replies to access to a website (URL) for article holder registration from the web browser application run by the information terminal 104 and transmits data of a personal information input screen to the information terminal 104. The calculation circuit 502 uses the web browser application and causes the display device 504 to display the personal information input screen.

Figure 7:
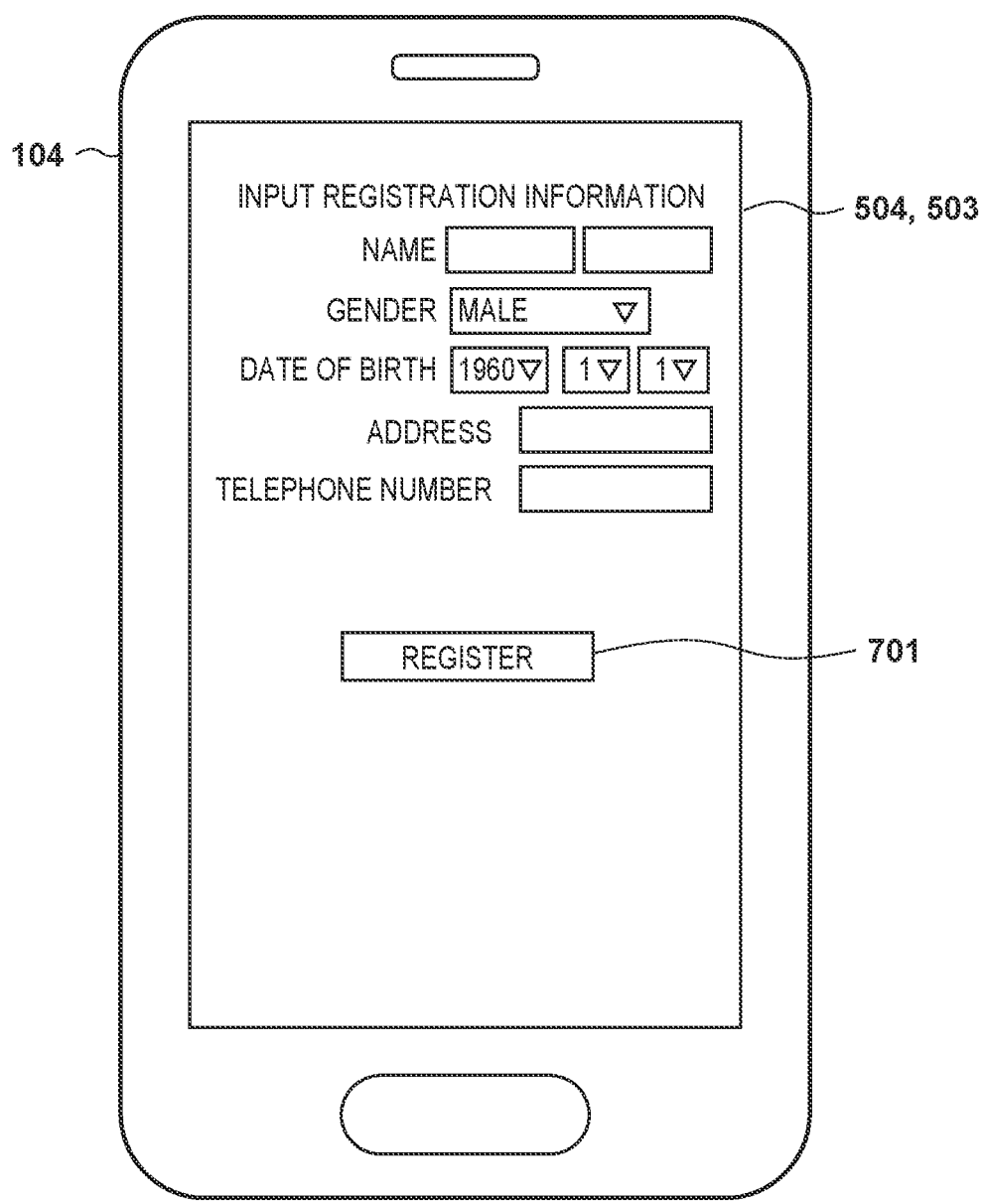
FIG. 7 is a diagram relating to registration processing for an article holder according to an embodiment.

FIG. 7 is an example of a personal information input screen. In this example, the entire display device 504 is used for the web browser application. Also, the display device 504 is a touch display and also functions as the input circuit 503. The article holder 108 inputs personal information in the input items by operating the display device 504 via touch and ends input of personal information by touching a registration button 701. When a touch operation on the registration button 701 is confirmed, the calculation circuit 502 transmits the items input on the screen to the information processing apparatus 102. When the personal information is received, the calculation circuit 206 generates an article holder record including a unique user ID, stores the received personal information in a predetermined field in the record, and stores this in the storage device 207. Note that though not illustrated in the example of FIG. 7, face information of the article holder 108 may be registered as personal information. In this case, data of a photo of the face of the article holder 108 taken using a camera of the information terminal 104 or the like may be included in the registration information. Also, a password for logging into the website for registrants may be included in the registration information.

Figure 8:
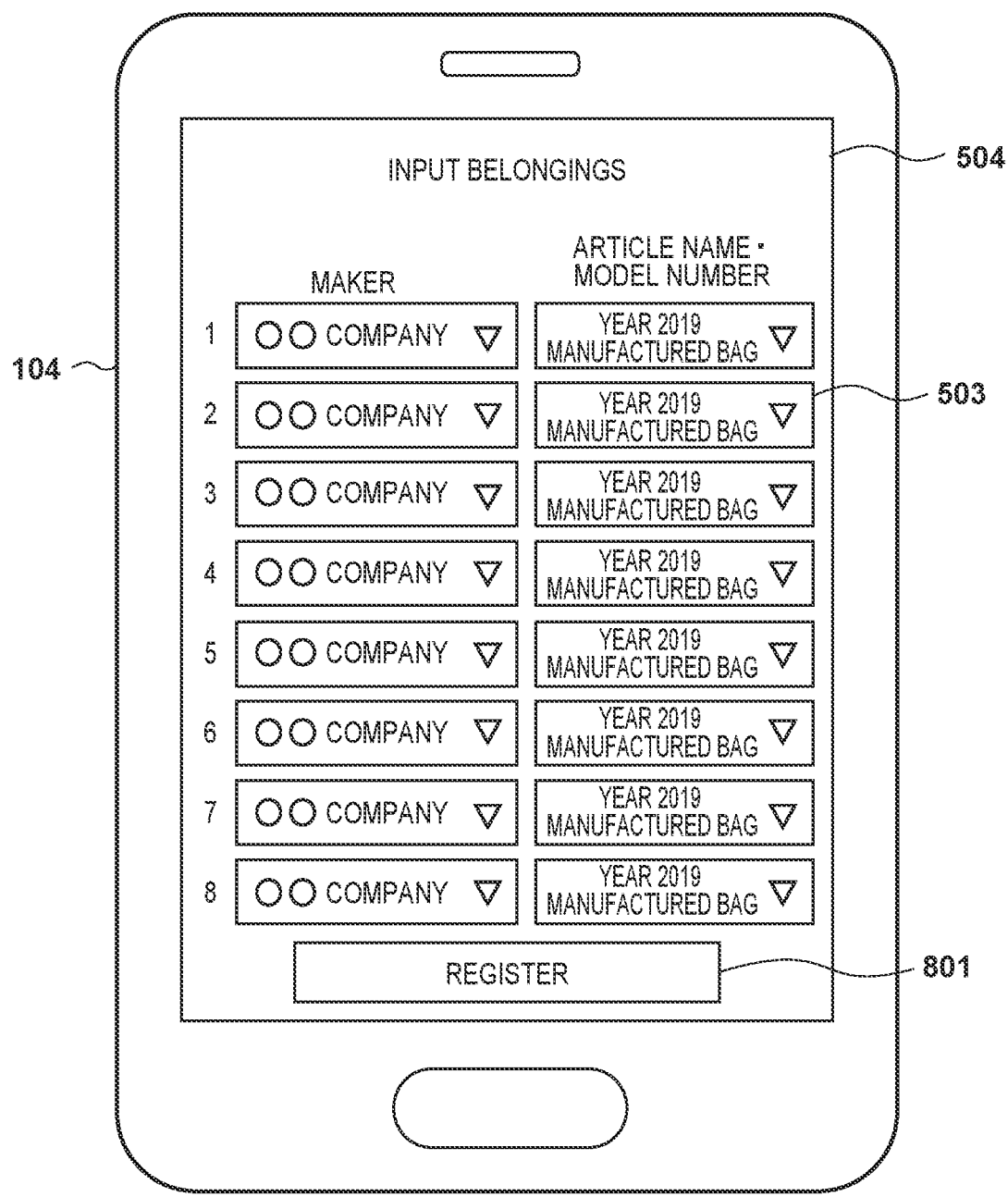
FIG. 8 is a diagram relating to registration processing for an article holder according to an embodiment.

In step S603, the calculation circuit 206 transmits data of the information input screen of the target article to the information terminal 104. FIG. 8 is a diagram illustrating an example of an input screen of the target article 106. In this example, an input screen is illustrated for registering a target article by selecting the maker and name or model of the product from a pull-down menu. However, the target article may be registered using another information that can be used to identify the target article. For example, a method may be used in which a photo of the target article is transmitted and the information processing apparatus 102 recognizes the target article. When a touch operation on a registration button 801 is confirmed, the calculation circuit 502 transmits the contents selected from the pull-down menu to the information processing apparatus 102. When the target article information is received, the calculation circuit 206 registers the information in the article holder record in the storage device 207.

Figure 9:
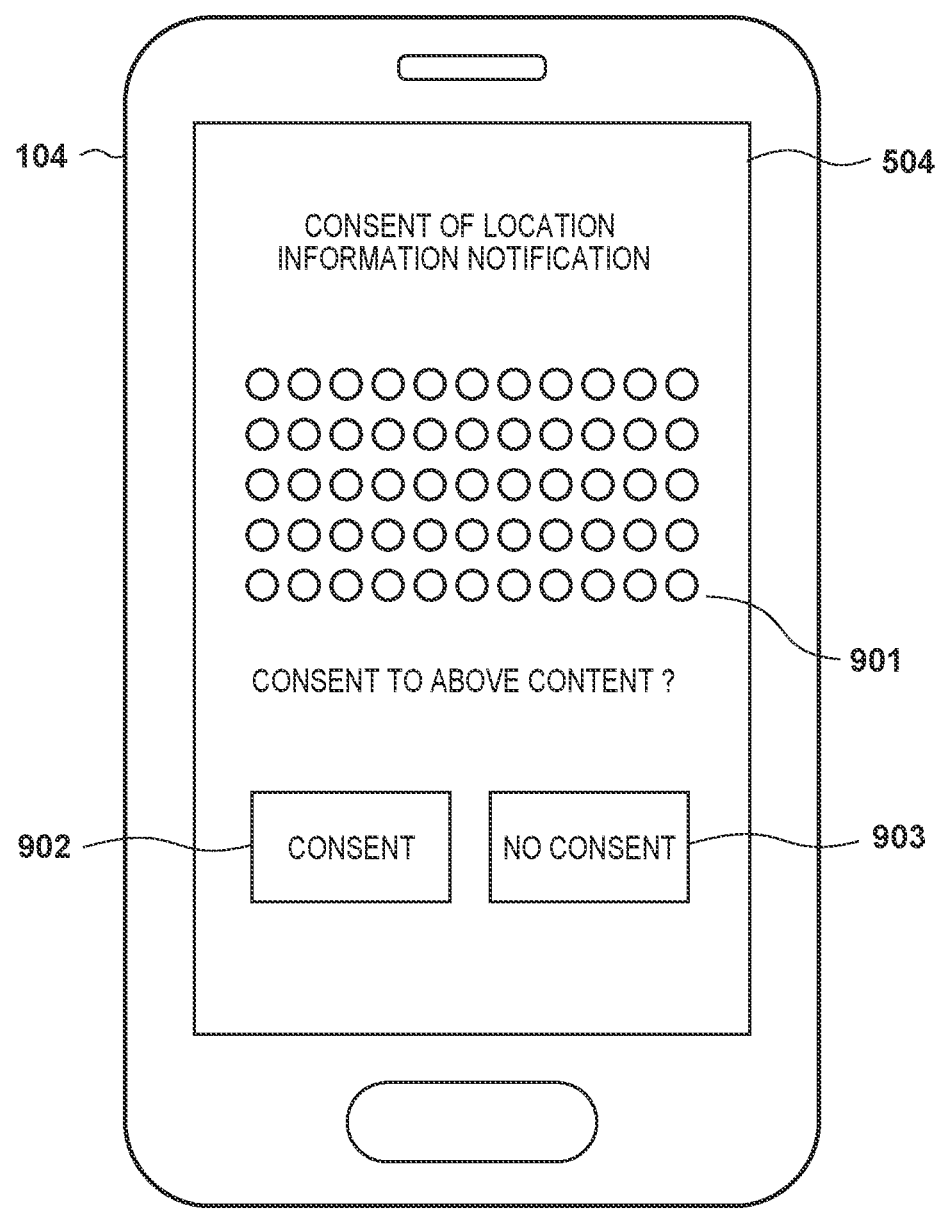
FIG. 9 is a diagram relating to registration processing for an article holder according to an embodiment.

In step S604, the calculation circuit 206 transmits, to the information terminal 104, data of an agreement input screen for granting permission to the advertisement company and the advertisement viewer to use the location information of the information terminal 104. FIG. 9 is a diagram illustrating an example of an agreement input screen for location information. The agreement input screen includes wording 901 explaining the contents of the permission grant, an agree (grant permission) button 902, and a do not agree (do not grant permission) button 903. When a touch operation on the agree button 902 is confirmed, the calculation circuit 502 informs the information processing apparatus 102 that agreement has been obtained. The calculation circuit 206 replies to the notification of agreement and formally registers the article holder 108. On the other hand, when a touch operation on the do not agree button 903 is confirmed, the calculation circuit 502 informs the information processing apparatus 102 that agreement has not been obtained. The calculation circuit 206 replies to the notification of non-agreement and discards the registration of the article holder 108. In this case, step S605 is not executed.

Figure 10:
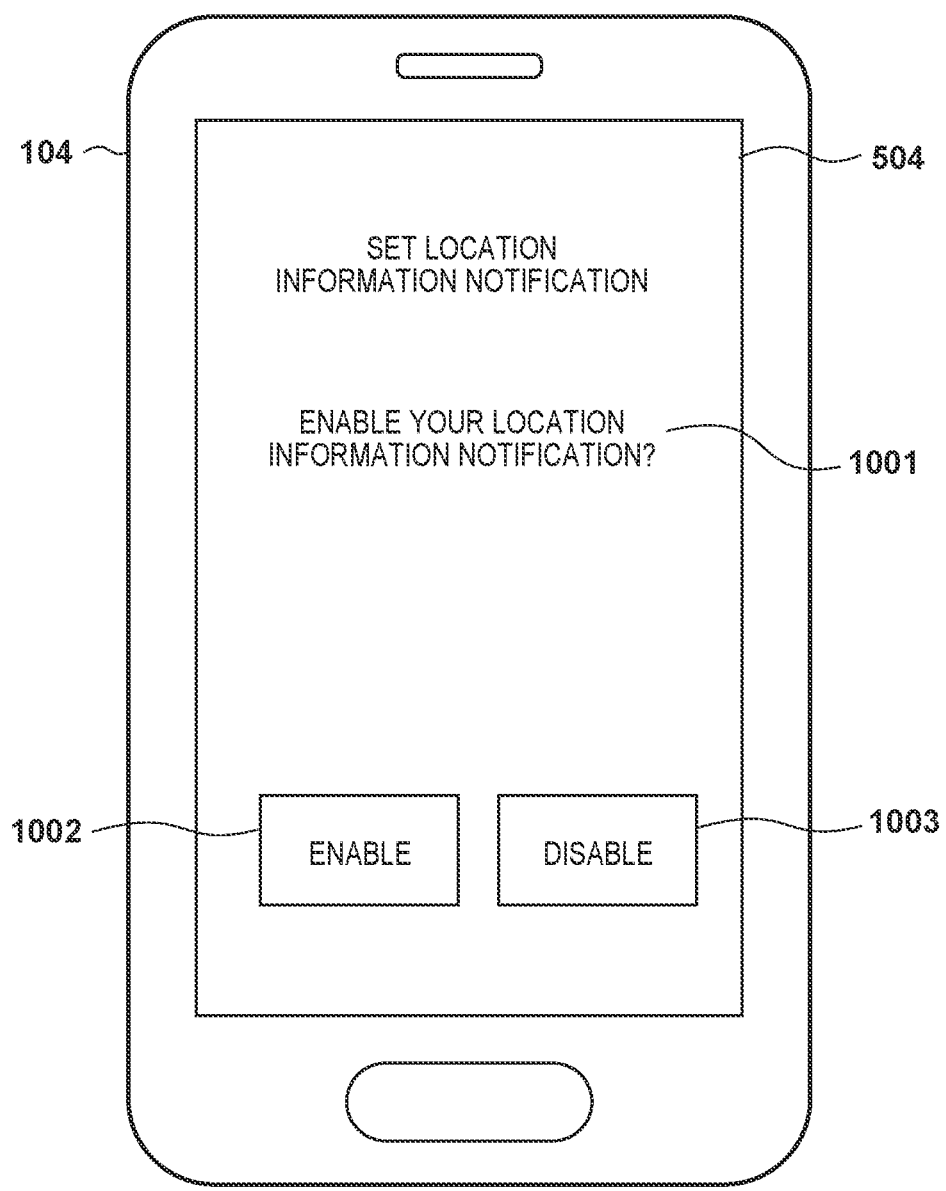
FIG. 10 is a diagram relating to registration processing for an article holder according to an embodiment.

In step S605, the calculation circuit 206 transmits, to the information terminal 104, data of a notification setting screen for setting whether to authorize notifications of the location information of the information terminal 104. FIG. 10 is a diagram illustrating an example of a notification setting screen for location information. The notification setting screen includes wording 1001 for explaining the settings, an enable button 1002, and a disable button 1003. When a touch operation on the enable button 1002 is confirmed, the calculation circuit 502 instructs the information processing apparatus 102 that notifications have been turned on or authorized. On the other hand, when a touch operation on the disable button 1003 is confirmed, the calculation circuit 502 instructs the information processing apparatus 102 that notifications have been turned off or unauthorized. The calculation circuit 206 registers the information indicating notifications being on or off in the record of the article holder 108. The calculation circuit 206 sends notifications of the location information to the advertisement viewer 107 only for the article holders 108 (the information terminals 104) that have notifications set to on.

The information of the article holder 108 registered via the screens described above may be changed at any time by the article holder 108 by using the information terminal 104 to log in to the website of the advertisement service provided by the information processing apparatus 102. Also, as described above, before the advertisement viewer 107 is actually informed of the location information of the article holder 108 (the information terminal 104), data of the notification setting screen may be transmitted from the information processing apparatus 102 to the information terminal 104. This allows for the location information to be informed only in cases where consent (notifications turned on) of the article holder 108 has been obtained.

Note that, in this example, the information terminal 104 uses a browser application and repeats the reception of the input screen and the transmission of registration information while communicating with the information processing apparatus 102. However, a dedicated application including the input screens may be installed in the information terminal 104, and all of the information may be transmitted as registration information from the information terminal 104 to the information processing apparatus 102 after all the information has finished being input.

Figure 11:
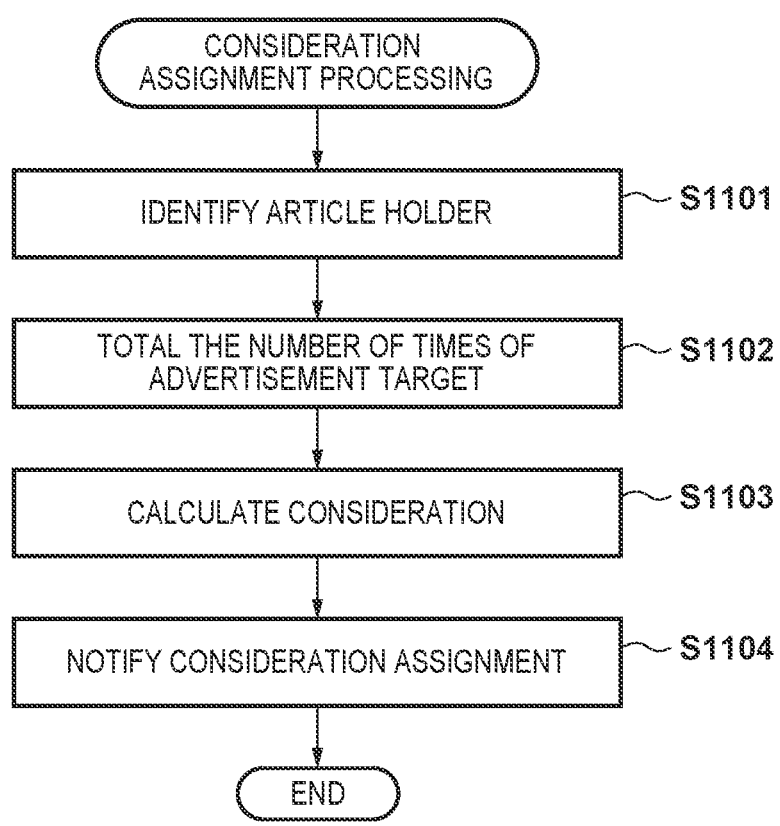
FIG. 11 is a flowchart relating to consideration assignment processing for an article holder according to an embodiment.

FIG. 11 is a flowchart relating to the operations of the information processing apparatus 102 relating to providing consideration (the consideration 117 of FIG. 1) to the article holder 108. This processing may be executed at specific periods, for example once every month.

In step S1101, the calculation circuit 206 identifies the article holder 108. The calculation circuit 206 may sequentially identify the article holder records stored in the storage device 207 in order of user ID, for example.

In step S1102, the calculation circuit 206 searches for the number of times the advertisement viewer 107 has been informed of the location information of an identified article holder. Note that the number of times may be the number of times in step S315 the location information of an identified article holder 108 has been informed or may be the total number of advertisement viewers 107 that have been informed of the location information. In both cases, the calculation circuit 206 measures and stores the number of times for each article holder 108 when tracking processing is executed.

In step S1103, the calculation circuit 206 determines the consideration based on the number of times. In this example, the consideration corresponds to points usable at a specific company, and the relationship between the number of times and the points is determined in advance.

Figure 12:
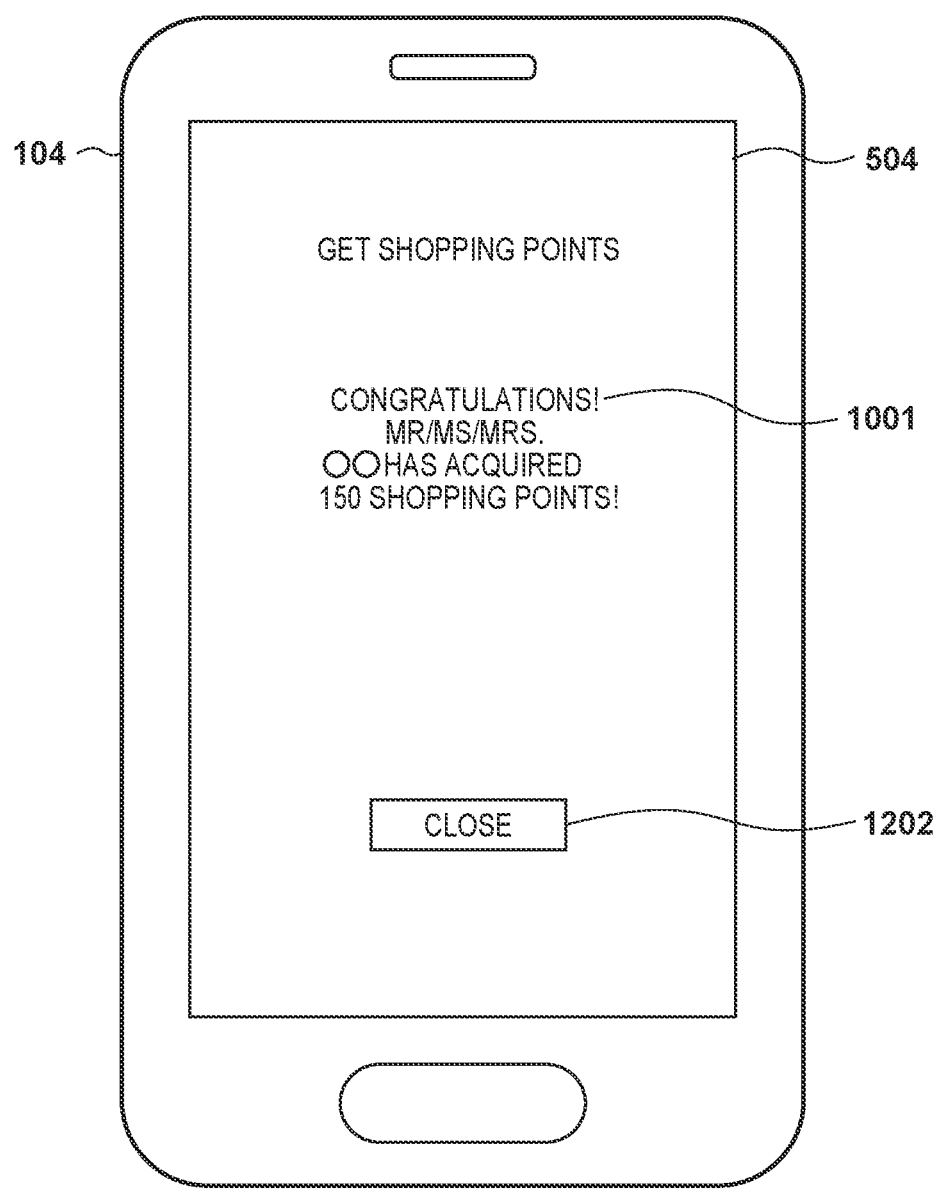
FIG. 12 is a diagram relating to consideration assignment processing for an article holder according to an embodiment.

In step S1104, the calculation circuit 206 transmits a point assignment notification to the information terminal 104 of the article holder 108 identified in step S1011. When the point assignment notification is received, the calculation circuit 502 of the information terminal 104 displays the point assignment notification screen on the display device 504 and informs the article holder 108. FIG. 12 is a diagram illustrating an example of the point assignment notification screen. The point assignment notification screen include wording 1201 for explaining the assignment contents and a close button 1202. When a touch operation on the close button 1202 is confirmed, the calculation circuit 502 closes the point assignment notification screen.

Next, the operations of the information processing apparatus 102 relating the registration procedure 113 of the advertisement viewer 107 illustrated in FIG. 1 will be described. Note that the functional configuration of the information terminal 103 of the advertisement viewer 107 and the information processing apparatus 102 is as described in reference to FIG. 2. As described above, the calculation circuit 206 causes the information processing apparatus 102 to function as a web server by executing a program, for example, and provides information for displaying various input forms to the web browser that accesses the web server.

Advertisement Viewer Registration Processing

Figure 13:
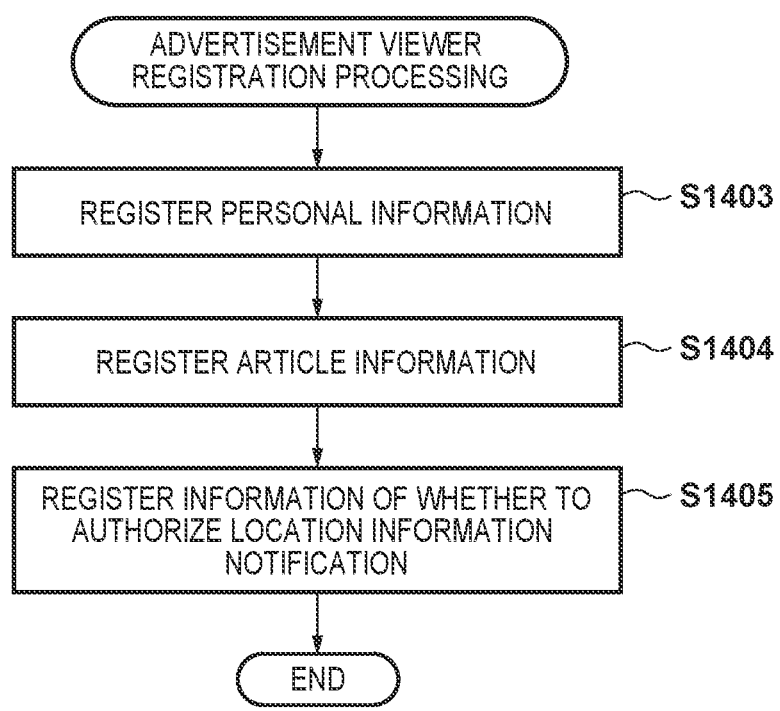
FIG. 13 is a flowchart relating to registration processing for an advertisement viewer according to an embodiment.

FIG. 13 is a flowchart relating to the operations of the information processing apparatus 102 relating to registration (the registration procedure 113 of FIG. 1) of the advertisement viewer 107.

In step S1403, the calculation circuit 206 replies to access to a website (URL) for advertisement viewer registration from the web browser application run by the information terminal 103 and transmits data of a personal information input screen to the information terminal 103. The calculation circuit 209 uses the web browser application and causes the display device 210 to display the personal information input screen. The personal information input screen may be the same as that described with reference to FIG. 7.

When the personal information is received from the information terminal 103, the calculation circuit 206 of the information processing apparatus 102 generates an advertisement viewer record including a unique user ID, stores the received personal information in a predetermined field in the record, and stores this in the storage device 207. Note that face information may be registered as personal information for the advertisement viewer in a similar manner as for the article holder. In this case, data of a photo of the face of the advertisement viewer 107 taken using a camera of the information terminal 103 or the like may be included in the registration information. Also, a password for logging into the website for registrants may be included in the registration information.

Figure 14:
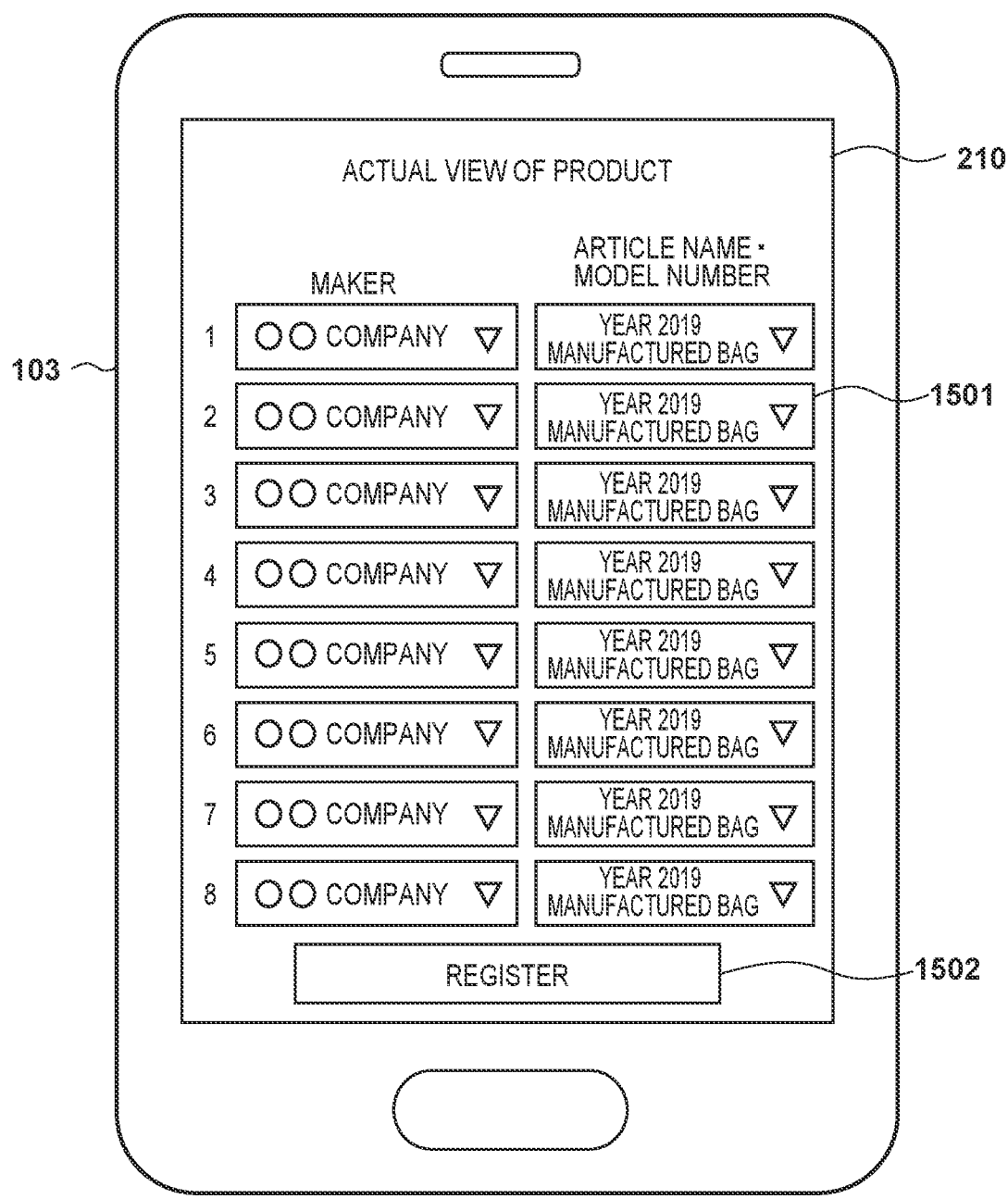
FIG. 14 is a diagram relating to registration processing for an advertisement viewer according to an embodiment.

In step S1404, the calculation circuit 206 transmits data of the information input screen of the target article to the information terminal 103. FIG. 14 is a diagram illustrating an example of an input screen of the target article 106. Basically, this screen may be the same screen used by the article holder to register the target article 106. As illustrated in FIG. 14, an input screen is illustrated for registering a target article by selecting the maker and name or model of the product from a pull-down menu 1501. However, the target article may be registered using another information that can be used to identify the target article. For example, a method may be used in which a photo of the target article is transmitted and the information processing apparatus 102 recognizes the target article. When a touch operation on a registration button 1502 is confirmed, the calculation circuit 209 transmits the contents selected from the pull-down menu to the information processing apparatus 102. When the target article information is received, the calculation circuit 206 registers the information in the advertisement viewer record in the storage device 207.

Figure 15:
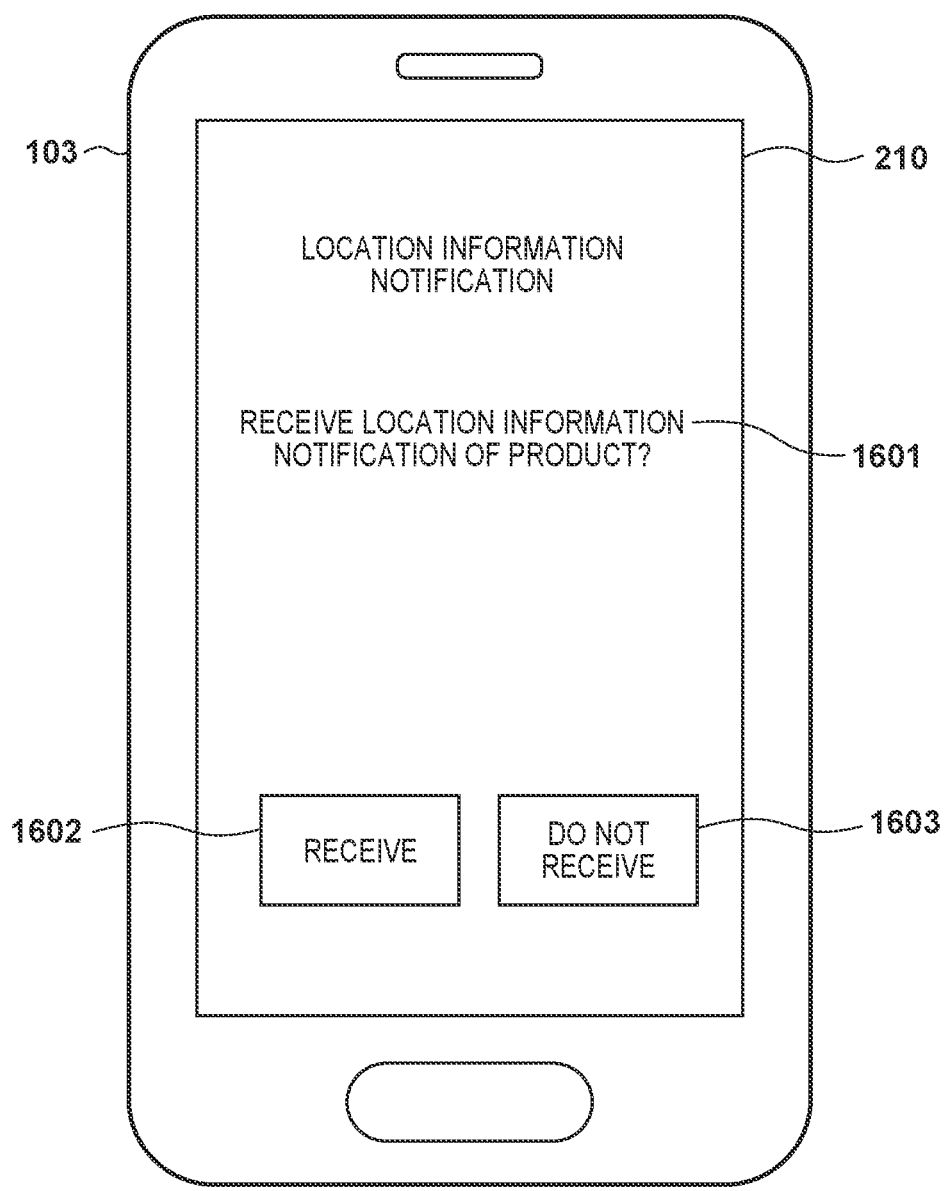
FIG. 15 is a diagram relating to registration processing for an advertisement viewer according to an embodiment.

In step S1405, the calculation circuit 206 transmits, to the information terminal 103, data of a notification setting screen for setting whether to authorize notifications of the location information of the information terminal 103. FIG. 15 is a diagram illustrating an example of a notification setting screen for location information. The notification setting screen includes wording 1601 for explaining the settings, an enable ("receive") button 1602, and a disable ("do not receive") button 1603. When a touch operation on the enable button 1602 is confirmed, the calculation circuit 209 instructs the information processing apparatus 102 that notifications have been turned on or authorized. On the other hand, when a touch operation on the disable button 1603 is confirmed, the calculation circuit 209 instructs the information processing apparatus 102 that notifications have been turned off or unauthorized. The calculation circuit 206 registers the information indicating notifications being on or off in the record of the advertisement viewer 107. The calculation circuit 206 informs only the advertisement viewer 107 (the information terminal 103) with notifications set to on of the location information of the article holder 108.

The information of the advertisement viewer 107 registered via the screens described above may be changed at any time by the advertisement viewer 107 by using the information terminal 103 to log in to the website of the advertisement service provided by the information processing apparatus 102. Also, before the information terminal 103 of the advertisement viewer 107 is actually informed of the location information of the article holder 108 (the information terminal 104), data of the notification setting screen may be transmitted from the information processing apparatus 102 to the information terminal 103. This allows for the location information of the article holder 108 to be informed only in cases where consent (notifications turned on) of the advertisement viewer 107 has been obtained.

Note that, in this example, the information terminal 103 uses a browser application and repeats the reception of the input screen and the transmission of registration information while communicating with the information processing apparatus 102. However, a dedicated application including the input screens may be installed in the information terminal 103, and all of the information may be transmitted as registration information from the information terminal 103 to the information processing apparatus 102 after all the information has finished being input.

Figure 16:
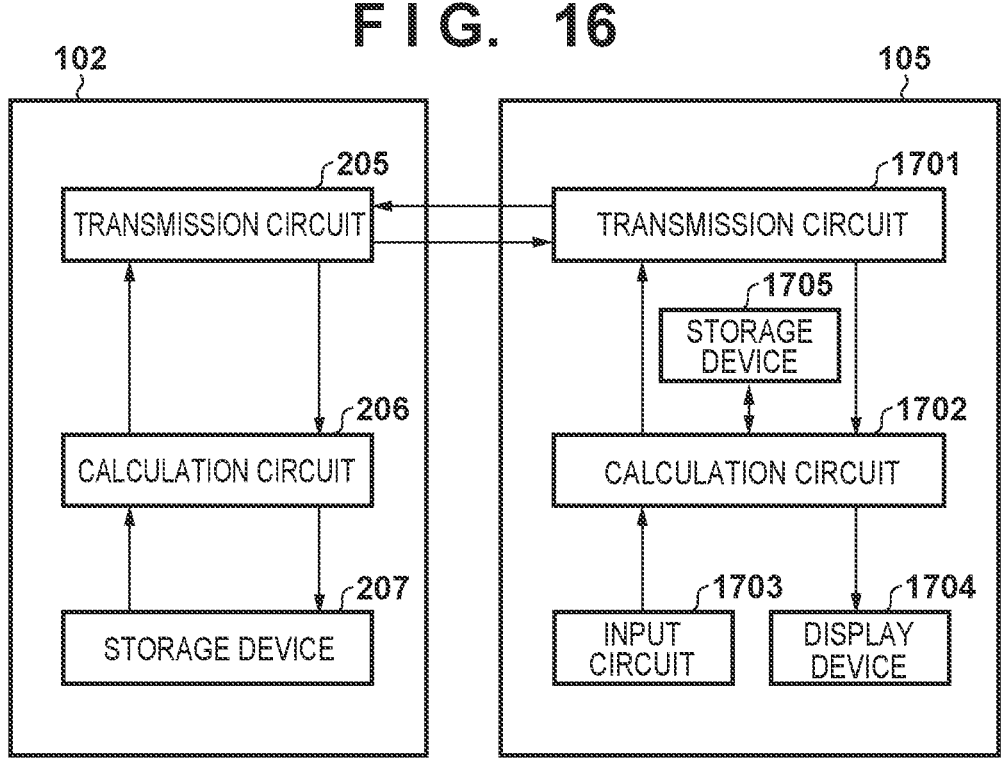
FIG. 16 is a block diagram illustrating an example of the functional configuration of an information terminal of an advertisement requester and an information processing apparatus according to an embodiment.

Invoice Processing for Registration and Advertisement Cost of Advertisement Requester Next, the operations of the information processing apparatus 102 relating to the registration procedure 115 of the advertisement requester 109 and an invoicing procedure 116 for the advertisement requester 109 illustrated in FIG. 1. FIG. 16 is a block diagram illustrating an information terminal 105 of the advertisement requester 109 and the information processing apparatus 102 and the functional configuration thereof relating to a request procedure 115 and the invoicing procedure 116. The functional configuration of the information processing apparatus 102 is as described in reference to FIG. 2.

The information terminal 105 is a computer device such as a stationary computer, for example. The information terminal 105 may also be a small computer device, such as a smart phone, a tablet computer, a laptop computer, or the like. The information terminal 105 includes a transmission circuit 1701, a calculation circuit 1702, an input circuit 1703, a display device 1704, and a storage device 1705.

The calculation circuit 1702 is a CPU, for example, that loads a program stored on a ROM of the storage device 1705 on a RAM of the storage device 1705 and executes the program. By the program being executed, the calculation circuit 1702 implements various operations of the information terminal 105, such as controlling the circuits inside the information terminal 105, communicating with an external device, and the like.

The transmission circuit 1701 is a communication interface between an external device and the information terminal 105 and is compliant with at least one wired and/or wireless communication protocol. Typically, the transmission circuit 1701 includes a wired communication interface compliant with Ethernet (registered trademark) and a communication interface compliant with a general-purpose wireless communication protocol, such as wireless LAN or Bluetooth (registered trademark). Note that in FIG. 16, the information terminal 105 and the information processing apparatus 102 are illustrated as communicating directly. However, they may communicate via a network.

The storage device 1705 includes the ROM, the RAM, an HDD, and the like. The ROM stores programs executed by the calculation circuit 1702, various setting values of the information terminal 105, and the like. The RAM is used when the calculation circuit 1702 executes programs, as buffer memory for various data, and the like. The HDD (or a large capacity storage device) stores information of the advertisement requester 109, user data, applications, and the like.

The display device 1704 is a liquid crystal display, for example, and displays various displays according to a program executed by the calculation circuit 1702. The display device 1704 may be a touch display. Also, the display device 1704 may be an external device of the information terminal 105.

The input circuit 1703 is an input device, such as a touch panel, a keyboard, or a mouse, operated by the advertisement requester 109.

As described above, the calculation circuit 206 of the information processing apparatus 102 causes the information processing apparatus 102 to function as a web server by executing a program, for example, and provides information for displaying various input forms to the web browser that accesses the web server.

The storage device 207 records the information relating to the registration procedure 115 and the invoicing procedure 116. Also, the storage device 207 functions as a web server and, when accessed by the information terminal 105, records a website for inputting and displaying the information relating to the registration procedure 115 and the invoicing procedure 116.

Figure 17:
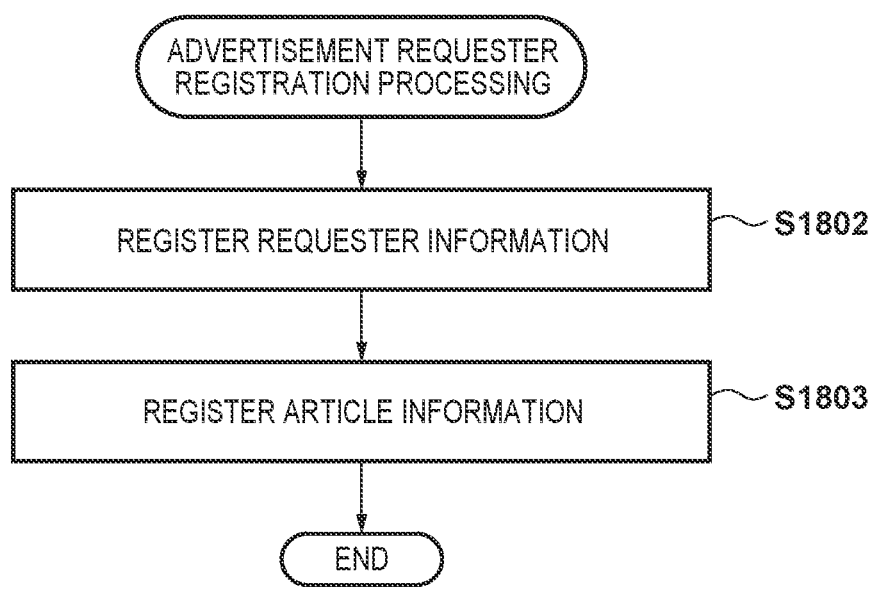
FIG. 17 is a flowchart relating to registration processing for an advertisement requester according to an embodiment.

FIG. 17 is a flowchart relating to the operations of the information processing apparatus 102 relating to registration (the registration procedure 115 of FIG. 1) of the advertisement requester 109.

In step S1802, the calculation circuit 206 replies to access to a website (URL) for advertisement requester registration from the web browser application run by the information terminal 105 and transmits data of an input screen for advertisement requester information to the information terminal 105. The calculation circuit 1702 uses the web browser application and causes the display device 1704 to display the input screen for requester information.

Figure 18A:
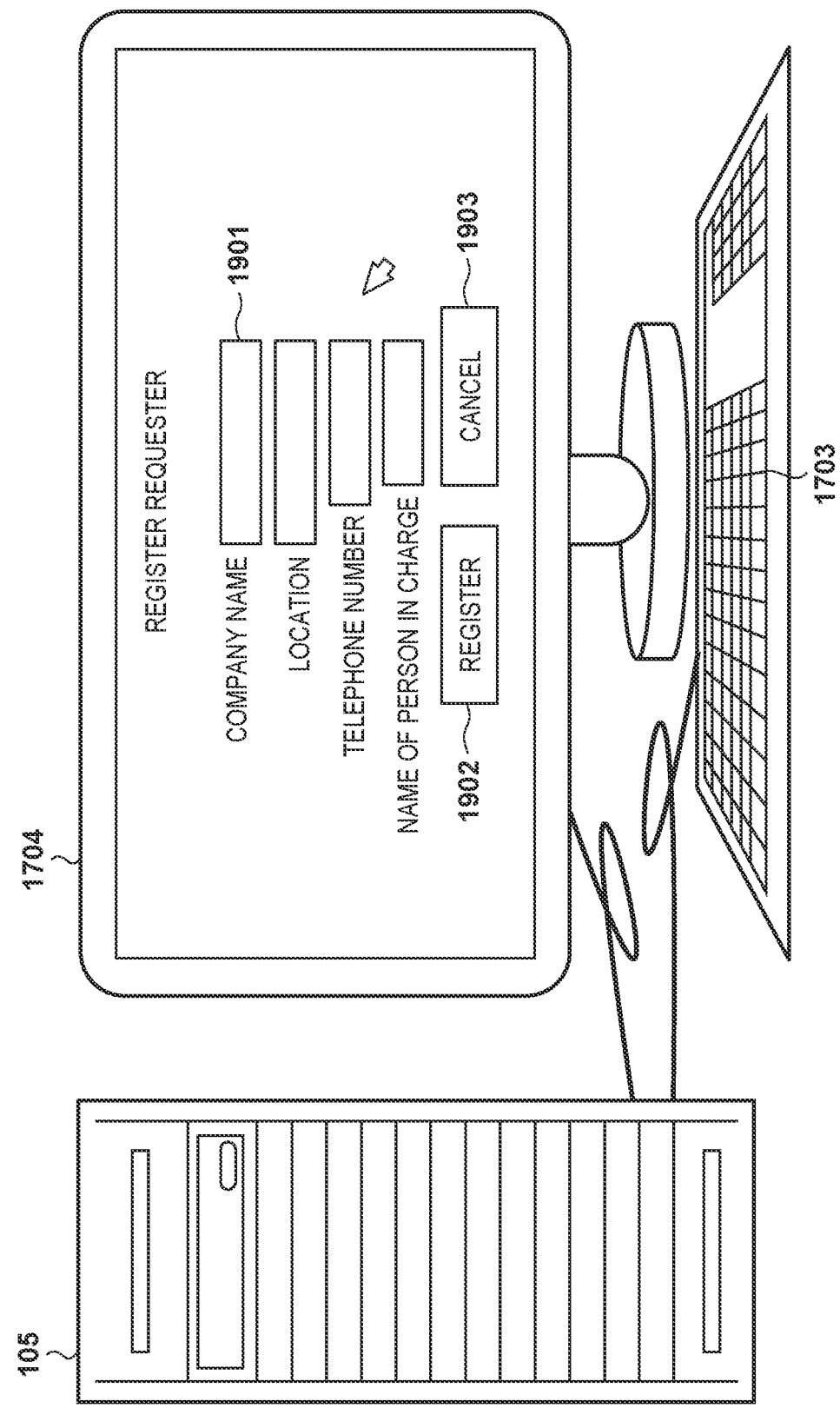

FIG. 18A is a diagram schematically illustrating the appearance of the information terminal 105 when the requester information input screen is displayed.

In this example, the entire display device 1704 is used for the web browser application. Also, because the advertisement requester is generally considered to be a company and not an individual, an input screen for registering company information as the requester information is illustrated. However, individual registration may also be performed.

The advertisement requester 109 operates the input circuit 1703 and inputs the requester information in each input item. Also, though not illustrated, a password for logging into the website for registrants may be input. Furthermore, by operating a registration button 1902 via clicking or the like, the information terminal 105 is informed of the input of the requester information. When an operation on the registration button 1902 is confirmed, the calculation circuit 1702 transmits the items input on the screen to the information processing apparatus 102. When the requester information is received, the calculation circuit 206 generates an advertisement requester record including a unique user ID, stores the received requester information in a predetermined field in the record, and stores this in the storage device 207. Note that in a case where an operation of a cancel button 1903 is detected, the calculation circuit 1702 confirms with the user (the advertisement requester) the stopping of registration processing. In a case where stopping of the registration processing is confirmed, the calculation circuit 1702 instructs the information processing apparatus 102 to cancel the registration processing and closes the input screen displayed on the browser application. In a case where stopping of the registration processing is cancelled, the calculation circuit 1702 continues displaying the input screen. When the calculation circuit 206 of the information processing apparatus 102 is instructed by the information terminal 105 to cancel the registration processing, the registration processing ends.

In step S1803, the calculation circuit 206 transmits data of the information input screen of the target article to the information terminal 105. FIG. 18B is a diagram illustrating an example of an information input screen 2001 for the target article 106. This screen may be the same screen used by the article holder to register the target article 106. However, in this example, more detailed information is able to be registered. In order to increase the subject recognition accuracy of the information processing apparatus 102, input of an image of the target article may be made necessary. Note that information of the target article is not limited to that illustrated in the diagram. When an operation on a registration button 2202 is confirmed, the calculation circuit 1702 transmits the input target article information to the information processing apparatus 102. When the target article information is received, the calculation circuit 206 registers the information in the advertisement requester record in the storage device 207. This ends the description of the registration processing for the advertisement requester 109. Note that the advertisement requester 109 that is already registered may change the requester information, add or delete the target article, change in the information of the target article, and the like by accessing the website for registrants provided by the information processing apparatus 102.

Note that to facilitate explanation and understanding, the description thereof is omitted. However, in reality, processes, such as binding of agreements relating the service provision, registering a fee payment method, and the like may be included between the advertisement requester and the advertisement company.

Figure 19:
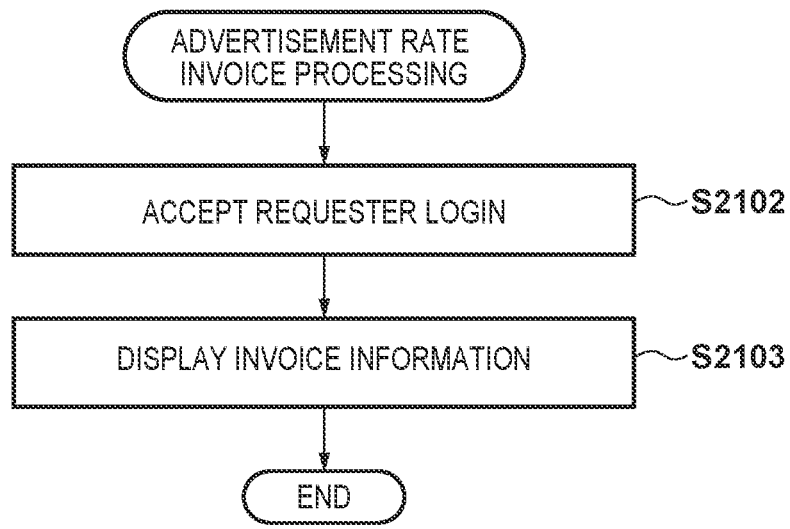
FIG. 19 is a flowchart relating to advertisement rate invoice processing according to an embodiment.

FIG. 19 is a flowchart relating to the operations of the information processing apparatus 102 relating to invoicing for the advertisement rate (invoice 116 in FIG. 1). Note that in the present embodiment, the advertisement requester 109 performs a bank transfer of the payment of the advertisement rate, and a service for viewing advertisement rates that require payment is provided as the invoicing processing for the advertisement rate.

In step S2102, the calculation circuit 206 replies to access to a website (URL) for registered advertisement requesters from the web browser application run by the information terminal 105 and transmits data of a login screen for the advertisement requester to the information terminal 105. The calculation circuit 1702 uses the web browser application and causes the display device 1704 to display the login screen.

Figure 20A:
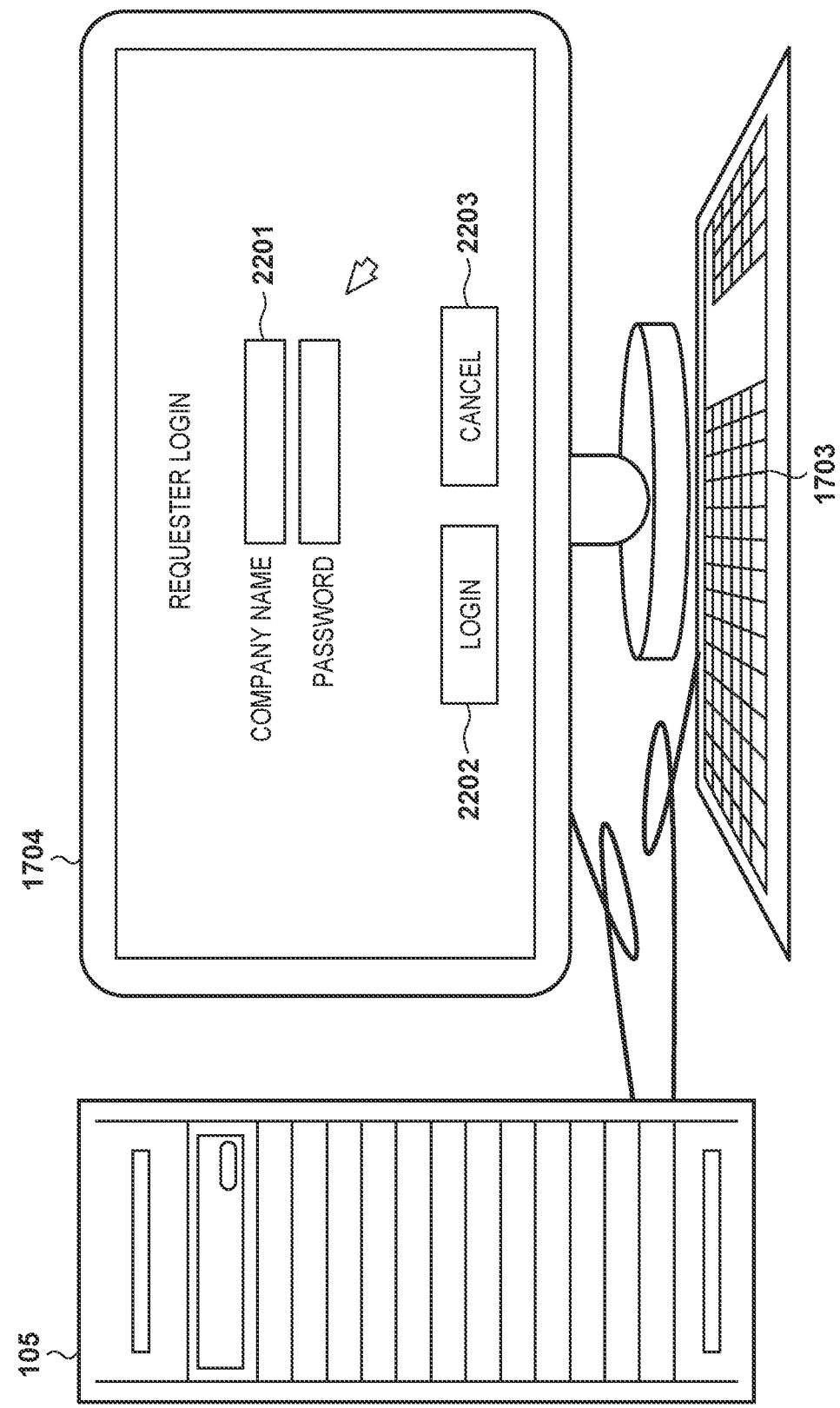
FIGS. 20A and 20B are diagrams relating to advertisement rate invoice processing according to an embodiment.

FIG. 20A is a diagram schematically illustrating the appearance of the information terminal 105 when a login screen 2201 for the advertisement requester is displayed.

In this example, login is received via a combination of the requester's name and password. However, any known method may be used, such as using a combination of a user ID and password, using biometric information, and the like.

The advertisement requester 109 inputs the requester name and password by operating the input circuit 1703. Furthermore, by operating a login button 2202 via clicking or the like, the information terminal 105 is informed of the input of the login information. When an operation on the login button 2202 is confirmed, the calculation circuit 1702 transmits the items input on the screen to the information processing apparatus 102. When the login information is received, the calculation circuit 206 searches the advertisement requester record and determines whether or not the login information is correct. In a case where the login information is determined to be correct, the calculation circuit 206 transmits, to the information terminal 105, the data of a service menu screen for registered advertisement requesters. The calculation circuit 1702 causes the display device 1704 to display the service menu screen.

Here, the advertisement requester 109 selects the invoice amount view from the service menu screen. The calculation circuit 1702 transmits a request to view the invoice amount corresponding to the selection to the information processing apparatus 102. When the request to view the invoice amount is received, the calculation circuit 206 references the advertisement requester record, obtains the billing information for a predetermined cumulative time period, and transmits this to the information terminal 105.

Figure 20B:
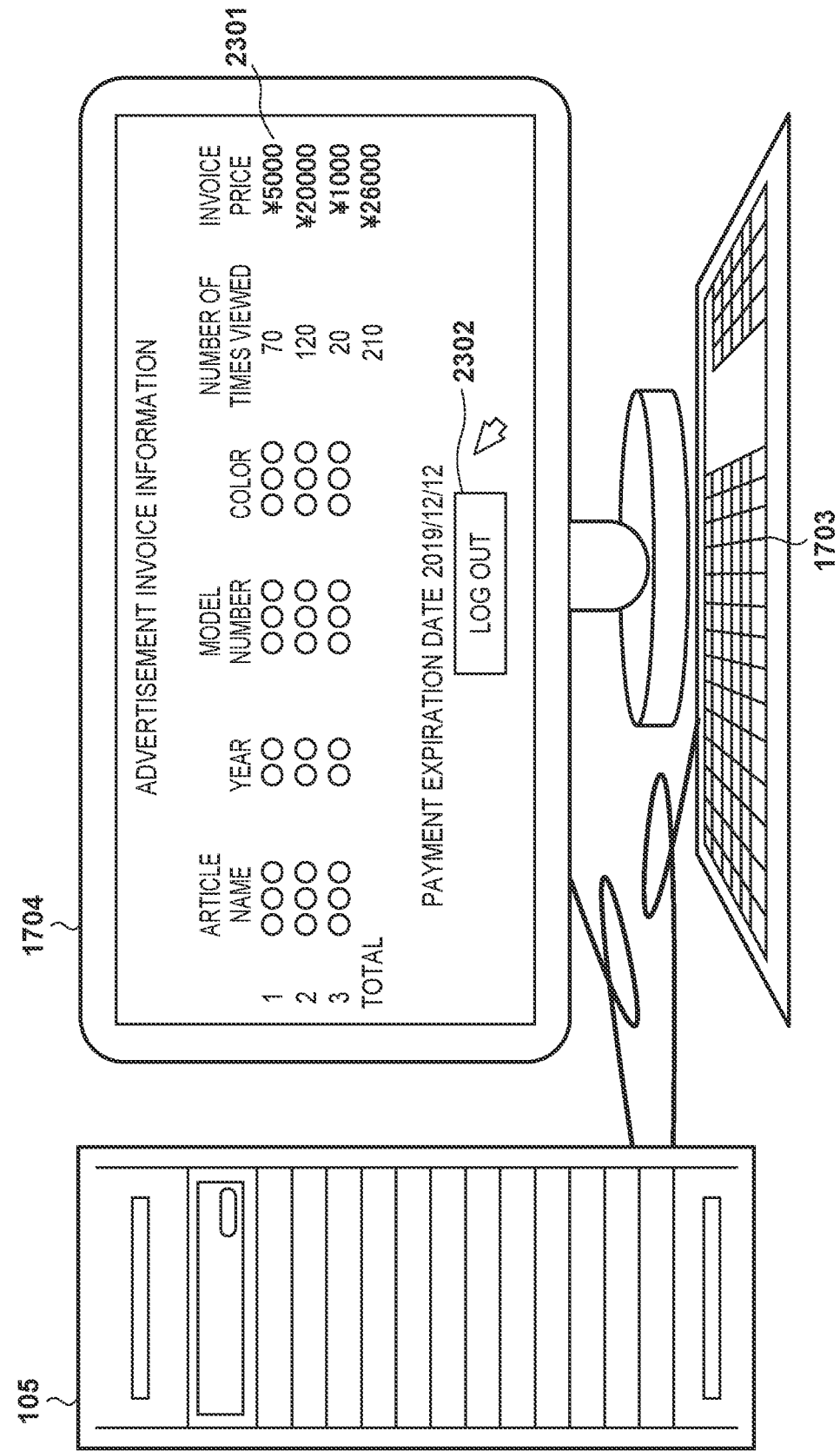

Note that the advertisement rate may be calculated based on the number of times the advertisement (the location information of the article holder 108) was provided to advertisement viewers for the target article registered by the advertisement requester 109, for example. Note that a detailed method of calculating the advertisement rate may be changed according to an agreement. Such plausible examples include a charge system in which a fixed amount is paid or in which the advertisement rate for one advertisement is reduced depending the more the number of times the advertisement is provided is increased, and the like. Also, the charge for one advertisement may be different depending on the cost or side of the article. The relationships between the number of times and the charge illustrated in FIG. 20B are simply examples. As described above, in the tracking processing, the calculation circuit 206 measures the number of times the advertisement viewer 107 is informed with location information for each target article 106 and stores this. Accordingly, the calculation circuit 206 may generate billing information containing the totaled advertisement rate for the advertisement requester 109 corresponding to the target article 106.

FIG. 20B is a diagram schematically illustrating the appearance of the information terminal 105 when a display screen 2301 of the billing information is displayed. The advertisement requester 109 can confirm the details and the amount of the invoiced advertisement rate via the display screen 2301. When an operation of a logout button 2302 is confirmed, the calculation circuit 1702 transmits a logout request to the information processing apparatus 102. When the logout request is received, the calculation circuit 206 executes logout processing. Thereafter, the advertisement requester 109 completes payment of an advertisement rate 118 by transferring the designated amount to the bank account of the advertisement company 100.

According to the advertisement system of the present embodiment, by the advertisement viewer registering an article they are interested in as the target article, the advertisement viewer can be informed that the actual target article is nearby. Accordingly, the actual target article can be confirmed by taking advantage of the fact that the target article is nearby. This allows for information that is unable to be obtained from the state of the article when on display in an advertisement or in the store to be easily obtained. Also, in a case where the article holder is carrying or using the target article, trends relating to the age, gender, and the like of the users can be known, allowing for an informed choice to be made when purchasing the target article.

Also, by registering the article they own, the article holder can obtain a consideration while going about their everyday life without giving it much thought. Also, providing the location information at undesired times can be avoided by temporarily setting the location information to be not provided.

Furthermore, by registering an article they wish to advertise, the advertisement requester can advertise using actual owners to advertisement viewer that are interested in the article. This is advantageous in that a more effective advertisement effect can be achieved.

Second Embodiment

Next, the second embodiment of the present disclosure will be described. In the first embodiment, the image capture apparatus 101 is placed at a fixed location outside, and the information terminal 103 of the advertisement viewer 107 that moves is informed of the location information of the target article 106. The present embodiment is directed at an environment in which the image capture apparatus also moves.

Figure 21A:
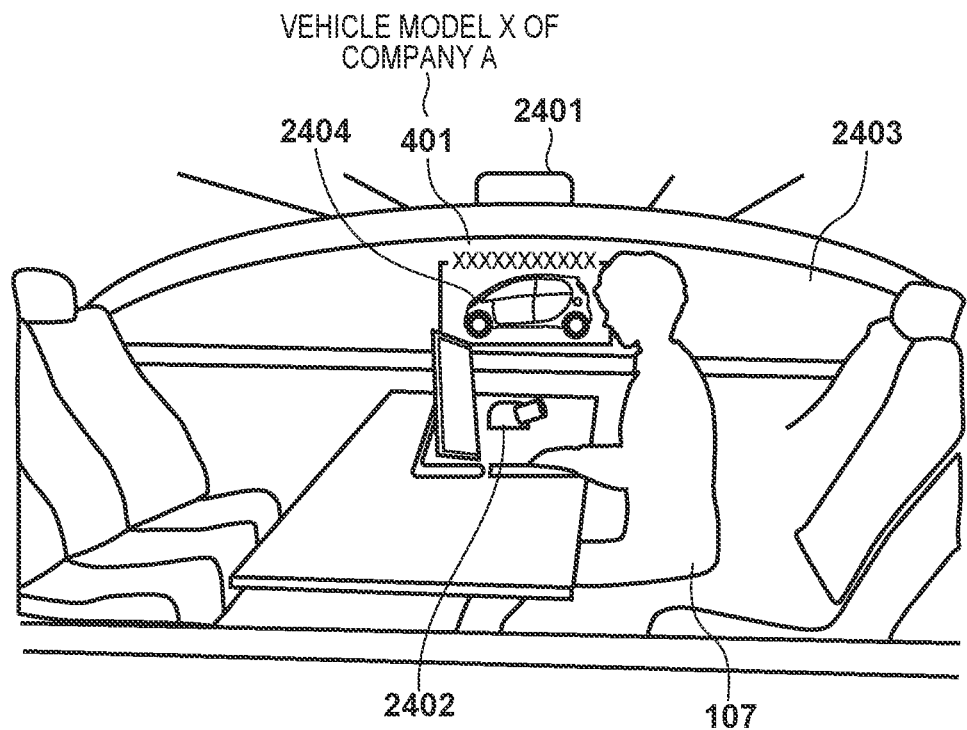
FIGS. 21A and 21B are schematic diagrams of the inside of a vehicle installed with an advertisement system according to a second embodiment.
Figure 21B:
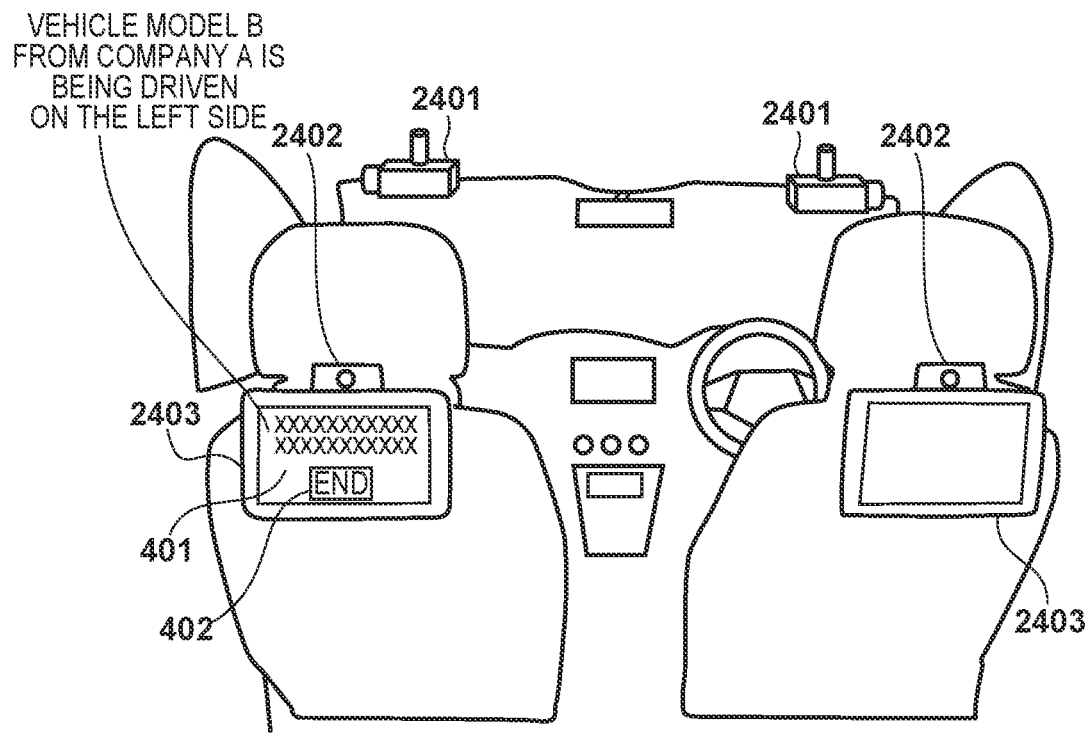

FIGS. 21A to 21B is a schematic diagram of the inside of a passenger vehicle that includes both an image capture apparatus of an advertisement system and an information terminal of an advertisement viewer. In the examples illustrated in FIGS. 21A and 21B, the location of the image capture apparatus and the information terminal are arranged differently. In this example, the passenger vehicle is capable of automated driving, but the passenger vehicle may not be capable of automated driving. The advertisement system of the present embodiment may be executed using the information processing apparatus 102 and the information terminals 103 to 105 described in reference to the first embodiment. Thus, the descriptions of the configurations of the devices are omitted.

An image capture apparatus 2401 captures an image of the surroundings outside the vehicle including the left and right sides of the vehicle and transmits the video data to the information processing apparatus 102 of the advertisement system. As illustrated in FIG. 21B, the image capture apparatus 2401 may include a plurality of image capture apparatuses. An image capture apparatus 2402 is provided to capture an image of a person riding in the vehicle. The information processing apparatus 102 may determine whether or not a registered advertisement viewer is in the vehicle from the video captured by the image capture apparatus 2402.

A display device 2403 is a transparent display device doubling as a side window in the example of FIG. 21A and a display device provided on a seat back in the example of FIG. 21B. The display device 2403 corresponds to the display device 210 of the information terminal 103 of the advertisement viewer 107 in the first embodiment. FIGS. 21A and 21B illustrate examples in which the message 401 is displayed as target article information in a case where a vehicle registered as the target article 106 by the advertisement viewer 107 riding in the vehicle is located nearby.

In the example of FIG. 21A, by a frame-like indicator being displayed around a region of the target article 106 on the display device 2403, which is a transparent display device, an augmented reality (AR) display is displayed in which the frame-like indicator is superimposed on what is seen through the display device 2403. For example, even in a case where the advertisement viewer 107 is working inside the vehicle, the number of times when the actual target article 106 can be seen can be increased.

Also, FIG. 21B is a diagram illustrating an example display of the target article information on the display device 2403, which is a display device for the rear portion of a seat. In this example, the message 401 indicating whether the target article is on the left side or the right side of the vehicle is displayed as the target article information. Note that video of the target article captured by the image capture apparatus 2401 may also be displayed together with the information. Also, the target article information may be displayed on the display device 2403 on the left side seat only in a case where the target article 106 is on the left side. The same applies to the display device 2403 on the right-side seat. Also, as illustrated in FIG. 21B, the target article information may be displayed only on the display device 2403 of the seat where the advertisement viewer 107 is sitting as determined by the image capture apparatus 2402. The above-described specific display device control methods for the display device 2403 that displays the target article information may be combined or no such control may be executed.

The display device for the rear portion of the seat is a touch display, and when a touch operation of the end button 402 is detected, the calculation circuit 209 ends the display of the message 401.

Figure 22:
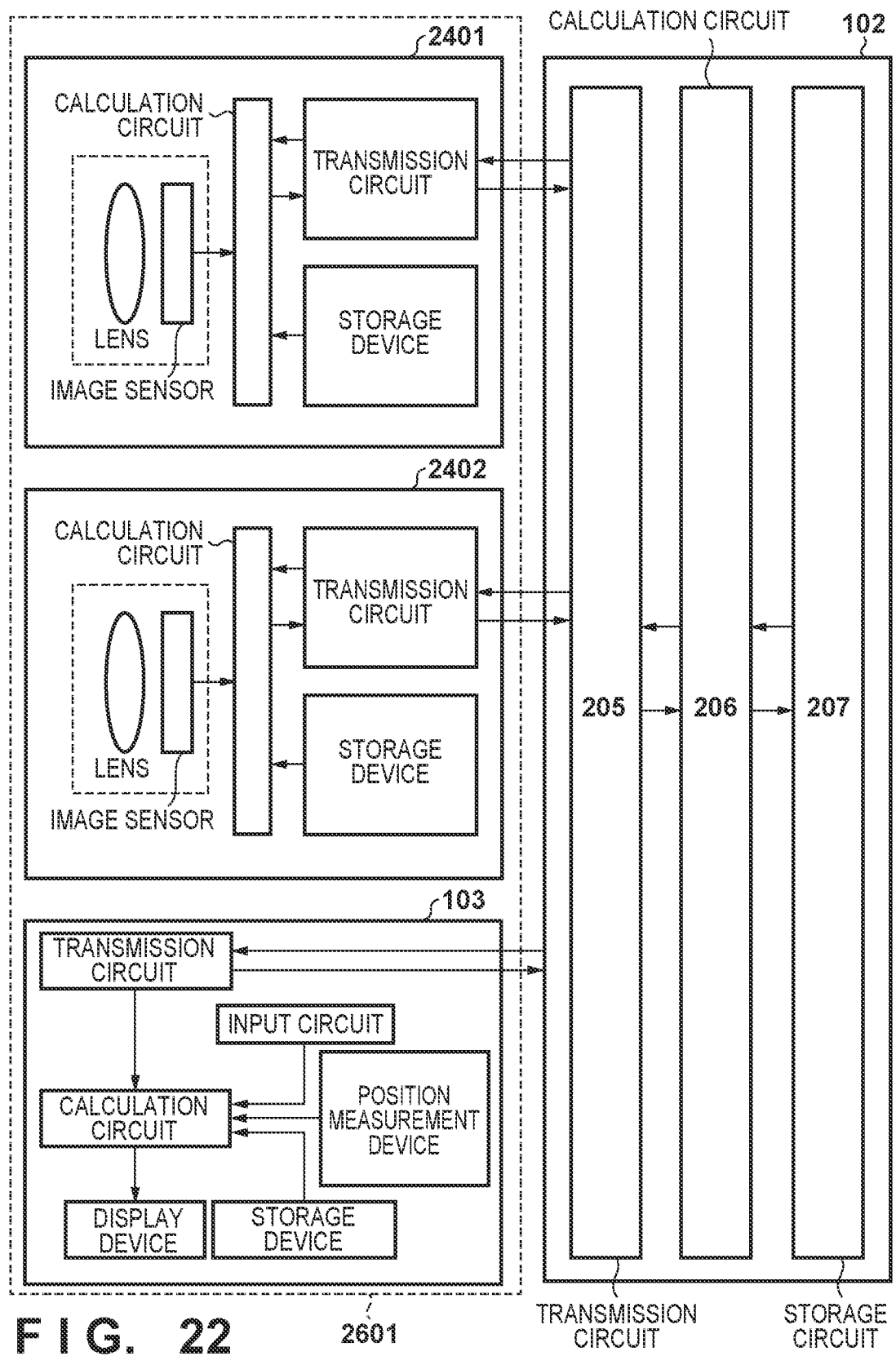
FIG. 22 is a block diagram illustrating an example of the functional configuration of apparatuses forming an advertisement system according to the second embodiment.

FIG. 22 is a block diagram illustrating the information processing apparatus 102 of the advertisement system of the present embodiment and a configuration example of the components provided in the vehicle. The configuration of the information processing apparatus 102 is the same as in the first embodiment. Also, the image capture apparatuses 2401, 2402 and the information terminal 103 are provided in a vehicle 2601. The configurations of the image capture apparatuses 2401, 2402 are the same as the image capture apparatus 101 of the first embodiment. Also the configuration of the information terminal 103 is the same as in the first embodiment. Note that in the example illustrated in FIG. 21B, the information terminal 103 is provided with two display devices capable of independent display. The information terminal 104 of the article holder 108 and the information terminal 105 of the advertisement requester 109 are not illustrated, but are the same as in the first embodiment.

The operations of the information processing apparatus 102 in the advertisement system of the present embodiment are basically the same as the operations in the first embodiment described with reference to FIGS. 3A to 3C, and thus descriptions thereof will be omitted. However, in a case where the image capture apparatus 101 moves as in the present embodiment, in recognition processing, the article holder 108 is difficult to recognize from the video data. Thus, in a case where the target article information is a vehicle, the vehicle registration number (the number on the number plate) is registered as the target article information, and in step S307, the calculation circuit 206 determines whether the target article 106 is present on the basis of number plate recognition. Note that the vehicle registration number used in registration and recognition may be only the designated number (the four-digit number portion ranging from xxx1 to 99-99).

Note that in a case where the vehicle is capable of automated driving of SAE J3016 level 2 or greater, the vehicle and the automated driving system may be connected in a manner such that the target article 106 is tracked and the vehicle is automatically driven to the location (or a location nearby) where the target article 106 is. For example, in a case where the target article 106 (vehicle) registered by the advertisement viewer 107 is found in a carpark, the vehicle is automatically parked in an open parking space next to or nearby the parking space of the target article 106. In this manner, if the advertisement viewer 107 is in a moving body, the target article 106 can be viewed at a close proximity.

The present embodiment can obtain the same effects as that of the first embodiment. Also, information of the target article 106 can be obtained in a timely manner even while moving in a vehicle.

OTHER EMBODIMENTS

In the embodiments described above, the advertisement viewer accesses a site of the advertisement system and explicitly registers in advance an article they are interested in. However, the advertisement viewer may register an article they are interested in by another method. For example, an article that the advertisement viewer may have interest in may be identified and automatically registered on the basis of the browsing history of the web browser application run on the information terminal of the advertisement viewer. In this case, consent to use the browsing history is obtained in the registration processing of the advertisement viewer. Technology for identifying an article a viewer may be interested in from browsing history include targeting advertisement technology using cookies of the web browser. Also, in a case where the advertisement viewer is shown in the video data and the direction the advertisement viewer is looking in (face orientation) can be detected, an article the advertisement viewer is looked at may be registered as an article they are interested in. For example, an article may be identified by the calculation circuit 206 recognizing an article in the direction the face is facing.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-75606, filed on Apr. 21, 2020, which is hereby incorporated by reference herein in its entirety.

What is claimed is:
1. An information processing apparatus comprising:
   a storage device that stores information for each of article holders and information for each of advertisement viewers, wherein the information for an article holder includes information of an article that is owned by the article holder and permitted to be used for advertising and the information for an advertisement viewer includes information of an article that the advertisement viewer is interested in;
   one or more processors that execute a program stored in a memory and function as:
   a detection unit configured to analyze video data obtained from an image capture apparatus to detect an article that has been pre-registered;

a determination unit configured to determine whether the article detected by the detection unit is permitted to be used for advertising by an article holder, by referring to the storage device;

a search unit configured to, in a case where the determination unit determines the article detected by the detection unit is permitted to be used for advertising, search for an advertisement viewer located within a range of a predetermined distance from the article holder from among advertisement viewers that have registered the article in the storage device; and an informing unit configured to inform an advertisement viewer found by the search unit of location information of the article.

2. The information processing apparatus according to claim 1, wherein the informing unit informs location information of the article holder that owns the article detected by the detection unit as the location information of the article.

3. The information processing apparatus according to claim 1, wherein:

the storage device further stores information of an article that has been pre-registered by an advertisement requester; and in a case where the article detected by the detection unit is an article that is permitted to be used for advertising by the article holder and that has been pre-registered by the advertisement requester, a consideration is given to the article holder.

4. The information processing apparatus according to claim 1, wherein:

the storage device further stores information of an article that has been pre-registered by an advertisement requester; and in a case where the article detected by the detection unit is an article that is permitted to be used for advertising by the article holder and that has been pre-registered by the advertisement requester, the advertisement requester is invoiced for an advertisement rate.

5. The information processing apparatus according to claim 1, wherein by executing the program, the one or more processors further function as:

a transmission unit configured to transmit a message to confirm possession of the article to the article holder who permits the article detected by the detection unit to be used for advertisement.

6. The information processing apparatus according to claim 1, wherein by executing the program, the one or more processors further function as:

a transmission unit configured to transmit a message querying as to whether or not to authorize to provide location information is transmitted to the article holder who permits the article detected by the detection unit to be used for advertisement.

7. The information processing apparatus according to claim 6, wherein the informing unit informs the advertisement viewer found by the searching unit of the location information of the article, in a case where an answer to the message is to authorize to provide location information, and does not inform the advertisement viewer found by the searching unit of the location information of the article, in a case where an answer to the message is not to authorize to provide location information.

8. The information processing apparatus according to claim 1, wherein the informing unit, in addition to the location information of the article detected by the detection unit, informs of video data in which the article detected by the detection unit is captured.

9. An information processing method executed by an information processing apparatus having a storage device that stores information for each of article holders and information for each of advertisement viewers, wherein the information for an article holder includes information of an article that is owned by the article holder and permitted to be used for advertising and the information for an advertisement viewer includes information of an article that the advertisement viewer is interested in, the information processing method comprising:

analyzing video data obtained from an image capture apparatus to detect an article that has been pre-registered;

determining whether the article detected in the analyzing is permitted to be used for advertising by an article holder, by referring to the storage device;

in a case where the determining determines that the article detected in the detecting is permitted to be used for advertising, searching for an advertisement viewer located within a range of a predetermined distance from the article holder from among advertisement viewers that have registered the article in the storage device; and informing an advertisement viewer found in the searching of location information of the article.

10. A non-transitory computer-readable medium storing a program including instructions, which when executed by one or more processors, cause an information processing apparatus to have a storage device that stores information for each of article holders and information for each of advertisement viewers, wherein the information for an article holder includes information of an article that is owned by the article holder and permitted to be used for advertising and the information for an advertisement viewer includes information of an article that the advertisement viewer is interested in, and to perform operations comprising:

analyzing video data obtained from an image capture apparatus to detect an article that has been pre-registered;

determining whether the article detected in the analyzing is permitted to be used for advertising by an article holder, by referring to the storage device;

in a case where the determining determines that the article detected in the detecting is permitted to be used for advertising, searching for an advertisement viewer located within a range of a predetermined distance from the article holder from among advertisement viewers that have registered the article in the storage device; and informing an advertisement viewer found in the searching of location information of the article.

* * * * *